(12) United States Patent
Blew

(10) Patent No.: US 11,352,117 B1
(45) Date of Patent: Jun. 7, 2022

(54) ENHANCED WAVE GENERATION METHODS AND SYSTEMS

(71) Applicant: GIGAWAVE LLC, Miami, FL (US)

(72) Inventor: Matthew Blew, Miami, FL (US)

(73) Assignee: GIGAWAVE LLC, Miami, FL (US)

( * ) Notice: Subject to any disclaimer, the term of this patent is extended or adjusted under 35 U.S.C. 154(b) by 0 days.

(21) Appl. No.: 17/350,938

(22) Filed: Jun. 17, 2021

Related U.S. Application Data

(60) Provisional application No. 63/147,236, filed on Feb. 8, 2021.

(51) Int. Cl.
| | |
|---|---|
| *B63H 21/17* | (2006.01) |
| *B63H 21/21* | (2006.01) |
| *B63H 11/00* | (2006.01) |
| *G01C 19/00* | (2013.01) |
| *B63B 1/28* | (2006.01) |
| *B63B 79/10* | (2020.01) |

(Continued)

(52) U.S. Cl.
CPC .............. *B63H 21/17* (2013.01); *B63B 1/26* (2013.01); *B63B 1/28* (2013.01); *B63B 79/10* (2020.01); *B63H 11/00* (2013.01); *B63H 21/21* (2013.01); *G01C 19/00* (2013.01); *G01P 15/00* (2013.01)

(58) Field of Classification Search
CPC ........ B63H 21/00; B63H 21/12; B63H 21/17; B63H 21/21; B63H 11/00; B63H 2011/008; B63H 11/02; B63H 1/00; B63H 1/02; B63H 1/12; B63H 1/14; B63H 1/26; B63H 1/28; B63B 79/00; B63B 79/10; B63B 34/70; B63B 34/75; G01C 19/00; G01P 15/00

USPC .......... 440/1, 49, 53, 84; 114/271, 274, 275, 114/278, 280
See application file for complete search history.

(56) References Cited

U.S. PATENT DOCUMENTS

| | | | |
|---|---|---|---|
| 6,012,408 A | 1/2000 | Castillo | |
| 6,105,527 A * | 8/2000 | Lochtefeld | .............. B63B 32/70 114/125 |
| 6,158,375 A | 12/2000 | Stuart, Jr. | |

(Continued)

FOREIGN PATENT DOCUMENTS

| | | |
|---|---|---|
| EP | 1 013 544 | 10/2004 |
| WO | 96/41057 | 12/1996 |

*Primary Examiner* — Daniel V Venne
(74) *Attorney, Agent, or Firm* — Hollowell Patent Group; Kelly Hollowell

(57) ABSTRACT

Apparatus and associated methods relate to configuring a watercraft propulsion system and control surface to generate a higher rate flow and a lower rate flow governed by the watercraft's yaw slip angle, adjusting the rate difference between the higher rate flow and the lower rate flow based on adjusting the yaw slip angle determined as a function of the control surface position and the propulsion system thrust vector, and directing by the watercraft the higher rate flow to converge with the lower rate flow to create a wave. The propulsion system may be a plurality of independently adjustable propulsion methods permitting propulsion system differential thrust vector adjustment. The control surface may be adjustable 360 degrees in the plane of the watercraft longitudinal axis. The yaw slip angle may be adjusted based on sensor information. Exemplary implementations may increase wave quality and improve maneuverability of a watercraft configured to create waves.

30 Claims, 22 Drawing Sheets

(51) Int. Cl.
  *G01P 15/00* (2006.01)
  *B63B 1/26* (2006.01)

(56) References Cited

U.S. PATENT DOCUMENTS

| | | |
|---|---|---|
| 6,581,537 B2 | 6/2003 | McBride et al. |
| 7,029,340 B2 * | 4/2006 | Smith .................. B63H 19/02 |
| | | 440/9 |
| 7,216,600 B1 | 5/2007 | Hamilton et al. |
| 8,336,477 B2 | 12/2012 | Walker |
| 8,798,825 B1 | 8/2014 | Hartman |
| 9,045,204 B1 | 6/2015 | Murphy |
| 9,067,644 B2 | 6/2015 | Sheedy et al. |
| 9,422,028 B2 | 8/2016 | Wilhelm |
| 9,505,464 B1 | 11/2016 | Wood |
| 9,889,909 B2 | 2/2018 | Morgan et al. |
| 10,112,688 B1 | 10/2018 | Hartman et al. |
| 10,717,502 B1 | 7/2020 | Hartman |
| 10,858,080 B1 | 12/2020 | Hartman et al. |
| 10,899,416 B1 | 1/2021 | Sheedy et al. |
| 2015/0197314 A1 | 7/2015 | Gasper et al. |
| 2016/0059934 A1 | 3/2016 | Wilhelm |
| 2017/0203823 A1 | 7/2017 | Abney |
| 2017/0217544 A1 | 8/2017 | Sheedy et al. |
| 2019/0152563 A1 | 5/2019 | McNaughton |
| 2021/0024173 A1 | 1/2021 | Sheedy et al. |

\* cited by examiner

ENHANCED WAVE GENERATION METHODS AND SYSTEMS

CROSS-REFERENCE TO RELATED APPLICATIONS

This application claims the benefit of U.S. Provisional Patent Application No. 63/147,236 filed Feb. 8, 2021. This application incorporates the entire contents of the priority application herein by reference.

TECHNICAL FIELD

This disclosure generally relates to generating waves enhanced for wake surfing.

BACKGROUND

A wave is a disturbance in a medium. Some waves propagate through water. Waves in water may occur naturally. For example, a wave in water may be a result of wind. A wave in water may be created by a machine interacting with the water.

Some waves in water are used for recreation or sports. For example, a person on a surfboard may ride on a wave. Some wave types may have characteristics more desirable for surfing than other waves. A surfer searching for predictable waves desirable for surfing may expend significant effort traveling to locations where such waves might naturally occur.

SUMMARY

Apparatus and associated methods relate to configuring a watercraft propulsion system and control surface to generate a higher rate flow and a lower rate flow governed by the watercraft's yaw slip angle, adjusting the rate difference between the higher rate flow and the lower rate flow based on adjusting the yaw slip angle determined as a function of the control surface position and the propulsion system thrust vector, and directing by the watercraft the higher rate flow to converge with the lower rate flow to create a wave. The propulsion system may be a plurality of independently adjustable propulsion sources permitting propulsion system differential thrust vector adjustment. The control surface may be adjustable 360 degrees in the plane of the watercraft longitudinal axis. The yaw slip angle may be adjusted based on sensor information. Exemplary implementations may increase wave quality and improve maneuverability of a watercraft configured to create waves. In the present disclosure the term "propulsion method" may be used interchangeably with the term "propulsion source."

Apparatus and associated methods relate to a wave generation system designed to generate an enhanced wave, based on configuring a watercraft with a control surface adjustable 360 degrees in plane with a watercraft's longitudinal axis to adjustably redirect a portion of the watercraft's wake, configuring the watercraft with an adjustable differential thrust propulsion system, moving the watercraft by the propulsion system to generate a wake, creating a wave based on redirecting by the control surface a wake portion to combine with another portion of the wake, and enhancing the wave based on a computer-implemented process actively adjusting the control surface position and propulsion systems' differential thrust based on the watercraft's yaw slip angle determined as a function of sensor information. Exemplary implementations may increase wave quality and improve maneuverability of the watercraft configured to enhance the wave, without trim tab components that may fail and increase cost.

In an aspect, an apparatus may comprise: a watercraft; a propulsion system configured in the watercraft, wherein the propulsion system comprises at least two propulsion methods disposed off-center from the watercraft's longitudinal axis, and wherein the propulsion system differential thrust vector is adjustable with respect to the watercraft longitudinal axis; a plurality of control surfaces configured in the watercraft and disposed off-center from the watercraft's longitudinal axis, wherein at least one control surface of the plurality of control surfaces is rotatably adjustable in the plane of the watercraft longitudinal axis; and a control system, comprising: a processor operably coupled with the propulsion system and the plurality of control surfaces; and a memory configured to be operably coupled with the processor, wherein the memory comprises encoded processor executable program instructions and data, wherein the instructions and data jointly program and configure the apparatus that when executed by the processor the instructions cause the apparatus to perform operations comprising: move the watercraft in water by the propulsion system to generate a water flow separated by the watercraft into a higher rate flow and a lower rate flow governed by the watercraft's yaw slip angle; adjust the rate difference between the higher rate flow and the lower rate flow based on adjusting the yaw slip angle determined as a function of the at least one control surface position and the propulsion system thrust vector; and direct the higher rate flow to converge with the lower rate flow to create and maintain a wave, based on actively adjusting the at least one control surface position and the propulsion system's differential thrust vector.

Each propulsion method of the least two propulsion methods may be independently adjustable.

Each propulsion method thrust magnitude may be adjustable.

Each propulsion method thrust direction may be adjustable.

At least one of the at least two propulsion methods may further comprise a motor.

The motor may be electric.

At least one of the at least two propulsion methods may further comprise a thruster pod.

At least one of the at least two propulsion methods may further comprise a water jet.

The plurality of control surfaces may further comprise at least two control surfaces.

The plurality of control surfaces may further comprise at least four control surfaces.

The at least one control surface of the plurality of control surfaces may be rotatably adjustable 360 degrees.

The at least one control surface of the plurality of control surfaces may further comprise at least one fin.

The at least one fin may be disposed in the watercraft hull, wherein the at least one fin disposed in the watercraft hull may be configured to pivot side to side in the plane of the horizon.

The at least one control surface of the plurality of control surfaces may further comprise at least one foil.

The at least one foil may be disposed in a side of the watercraft, wherein the at least one foil disposed in the side of the watercraft may be configured to rotate in the plane of the watercraft's vertical axis.

The at least one control surface of the plurality of control surfaces may be disposed forward of at least one propulsion method.

The at least one control surface of the plurality of control surfaces may be disposed aft of at least one propulsion method.

The apparatus may further comprise an electric servo motor operably coupled with the processor, wherein the electric servo motor may be configured to adjust the position of the at least one control surface of the plurality of control surfaces.

The apparatus may further comprise a hydraulic cylinder operably coupled with the processor, wherein the hydraulic cylinder may be configured to adjust the position of the at least one control surface of the plurality of control surfaces.

The control system may further comprise a camera operably coupled with the processor.

The operations performed by the apparatus may further comprise provide feedback determined as a function of a rider's stance and position riding the wave, based on identifying by an image recognition algorithm an image of the rider captured by the camera.

The operations performed by the apparatus may further comprise changing the wave in a user defined pattern for a predetermined time period, based on actively adjusting the at least one control surface position and the propulsion systems' differential thrust vector according to the predetermined pattern for the predetermined time period.

The operations performed by the apparatus may further comprise adjust the thrust magnitude of at least one propulsion method.

The operations performed by the apparatus may further comprise adjust the thrust direction of at least one propulsion method.

The operations performed by the apparatus may further comprise adjust at least one control surface position.

The control system may further comprise at least one sensor operably coupled with the processor.

The operations performed by the apparatus may further comprise determine the yaw slip angle based on sensor information.

The operations performed by the apparatus may further comprise determine the control surface position based on sensor information.

The at least one sensor may further comprise an accelerometer.

The at least one sensor may further comprise a gyroscopic sensor.

The at least one sensor may further comprise a location sensor.

An exemplary wave generation apparatus may be a surf system. The wave generation apparatus may comprise a machine. The machine may comprise a watercraft. The exemplary wave generation apparatus may include a plurality of control surfaces and a plurality of propulsion methods. The wave generation apparatus may comprise two propulsion methods. The wave generation apparatus may comprise more than two propulsion methods. At least one propulsion method may be disposed off-center of the watercraft longitudinal axis. The wave generation apparatus may comprise a plurality of propeller shafts and a plurality of control surfaces mounted to a watercraft's running surfaces. At least one control surface of the plurality of control surfaces may be mounted to a watercraft's running surface forward of the transom. The wave generation apparatus may be configured with control circuitry and software designed to modulate and set differential thrust vectors between at least two motors, and change the control surface angles, to affect a watercraft's yaw slip angle. At least one control surface may be a rudder disposed in the aft hull and configured to be adjustable 360 degrees in plane with a watercraft's longitudinal axis. The yaw slip angle may be determined based on sensor information. A computer-implemented process may actively govern control surface position and motor thrust based on the sensor information, enhancing the wave by adjustably engaging the plurality of motors' differential thrust and manipulating control surfaces to change the yaw slip angle.

An exemplary wave generation apparatus may comprise at least two 360-degree control surfaces independently adjustable by a computer-implemented process control algorithm based on sensor information. The wave generation apparatus may comprise forward and aft control surfaces of different control surface types. At least one control surface may be a rudder. At least one control surface may be a fin. At least one control surface may be a foil. The wave generation apparatus may comprise a plurality of propulsion methods, and at least one propulsion method may comprise a plurality of motors. Each motor's thrust may be independently adjustable by a computer-implemented process control algorithm. At least one motor may be electric. The plurality of propulsion methods may comprise a water jet. Each water jet's thrust may be independently adjustable by a computer-implemented process control algorithm. The plurality of motors' differential thrust may be adjustable by the control algorithm. Each water jet's thrust vector may be independently adjustable 360-degrees in plane with the watercraft's longitudinal axis. The propulsion methods may comprise a plurality of thruster pods. Each thruster pod's thrust vector may be independently adjustable by the control algorithm. Each thruster pod's thrust vector may be independently adjustable 360-degrees in plane with the watercraft's longitudinal axis. The plurality of thruster pods' differential thrust may be adjustable by the control algorithm. The control algorithm may be designed to actively adjust the motors, thruster pods, and control surfaces based on processing information from one or more sensor, such as heading, speed, or yaw information. In an illustrative example, the wave generation apparatus computer may adjust the motor's thrust to modulate the yaw slip angle of the apparatus. An exemplary wave generation apparatus may comprise hydraulic pumps, servo electric motors, or actuators configured to move the control surfaces mounted to the running surfaces, the bottom, or sides of the apparatus.

In an aspect, an apparatus is disclosed, comprising a watercraft configured with a control surface adjustable 360 degrees in plane with the watercraft's longitudinal axis to adjustably redirect a portion of the watercraft's wake; an adjustable differential thrust propulsion system configured in the watercraft, the propulsion system comprising two propulsion methods each disposed off-center from the watercraft's longitudinal axis; a processor operably coupled with the control surface and the propulsion system; and a memory configured to be operably coupled to the processor, wherein the memory comprises encoded processor executable program instructions and data, wherein said instructions and data program and configure the processor that when executed by the processor cause the apparatus to perform operations comprising: move the watercraft by the propulsion system to generate a wake; create a wave based on redirecting by the control surface a wake portion to combine with another portion of the wake; and enhance the wave based on actively adjusting the control surface position and propulsion systems' differential thrust based on the watercraft's yaw slip angle determined as a function of sensor information.

In an illustrative example, an exemplary wave generation apparatus may be implemented without control surfaces mounted to and/or extending off the transom of the craft. An exemplary wave generation apparatus may be implemented without trim tab components. An exemplary wave generation apparatus may be implemented without water tanks or sensors associated with the hull measuring the yaw slip angle. An implementation in accordance with the disclosed exemplary wave generation apparatus design may reduce the number of control surfaces mounted to the transom of the craft according to previous designs. The exemplary dual motor, control surface and software system enables more precise and dynamic control of the yaw slip angle of the apparatus moving through the water.

In another aspect, a method is disclosed, comprising configuring a watercraft with a control surface adjustable 360 degrees in plane with the watercraft's longitudinal axis to adjustably redirect a portion of the watercraft's wake; configuring the watercraft with an adjustable differential thrust propulsion system comprising two propulsion methods disposed off-center from the watercraft's longitudinal axis; moving the watercraft by the propulsion system to generate a wake; creating a wave based on redirecting by the control surface a wake portion to combine with another portion of the wake; and enhancing the wave based on a computer-implemented process actively adjusting the control surface position and propulsion systems' differential thrust based on the watercraft's yaw slip angle determined as a function of sensor information.

Various implementations may achieve one or more technical effect. For example, some implementations may improve a user's ease of access to waves. This facilitation may be a result of reducing the user's effort adjusting their schedule to accommodate travel to locations where natural waves useful for surfing may appear. In some implementations, a wave optimized for surfing may be automatically generated for a user at a time and place of the user's choosing. Such automatic optimized wave generation may improve availability of optimal surfing waves to a user. Some wave generation implementations may improve the shape consistency of generated waves. Such improved wave shape consistency may be a result of eliminating the effect of prop torque on waves, based on the disclosed design's at least two propulsion methods. For example, motor torque from a legacy system employing one propulsion method may cause the craft to roll to one side in the direction of prop torque, causing the craft to displace more water on that side, resulting in an uneven wave shape wherein the wave may be better on that one side, with poorer quality on the other side. Some implementations may improve quality of a generated wave, enhancing the wave with a clean surface and larger barrel. Such improved wave quality may be a result of increased wave energy and higher flow rate based on utilizing control surfaces and differential thrust, and thrust vectoring, to redirect water flow to converge with other portions of the water trailing the craft.

Some implementations may provide a user with customized waves generated according to a user's preferences. Such customized generated waves may be a result of a control system configured to generate a wave with predetermined characteristics. Some designs may increase a user's exposure to practice or training scenarios including waves of various types and difficulty levels for surfing. This facilitation may be a result of a wave generation system configured to create challenging experiences with progressively changing wave characteristics for a user over time. In an illustrative example, some designs may improve user safety. Such improved safety may be a result of a wave generation system configured to create a wave with predetermined characteristics relative to a user's level of proficiency. An exemplary implementation may reduce the effort required to retrieve a fallen wave rider. This facilitation may be a result of improved watercraft maneuverability due to adjustable thrust vector propulsion and 360 degree adjustable control surfaces, permitting quick 180 degree reorientation of an exemplary wave generation system in-place to retrieve a fallen rider, without needing to make a longer and more dangerous U-turn.

Some wave generation implementations may improve the symmetry between wave shapes on both sides of the water flowing behind a wave generation apparatus. Such improved symmetry between wave shapes on both sides behind a wave generation craft may be a result of a wave generation design that eliminates prop torque. For example, an implementation in accordance with the present disclosure may comprise a multiple engine system configured to create a symmetrical water shape on both sides of the water flowing behind the craft, as a result of zero prop torque created by the multiple engine configuration. In an illustrative example, prop torque from a single engine may roll the machine, and create a better wave on one side relative to the wave on the other side. For example, prop torque from a clockwise-rotating propeller may create a more desirable surface for surfing on the water flowing behind the machine on the right side, and a less desirable surface for surfing on the water flowing behind the machine on the left side; this is not desirable, because the majority of users employ techniques enabling them to only ride the left side of the water trailing the machine.

The details of various aspects are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

To aid understanding, this document is organized as follows. First, generating a wave based on adjusting control surfaces and differential thrust vector propulsion configured in a machine to create different rate flows separated by the machine based on the machine's yaw slip angle as the machine moves in water, and directing the flows to converge and form a wave trailing the machine, is briefly introduced with reference to FIG. 1. Second, with reference to FIGS. 2A-5D, the discussion turns to exemplary implementations that illustrate wave generation design. Specifically, exemplary wave generation apparatus, propulsion method, and control surface designs are disclosed. Then, with reference to FIGS. 6-13, operation of exemplary wave generation system control surface and propulsion system configurations are described. Finally, with reference to FIGS. 14-18C, exemplary wave generation control system, process flow, network, and feature implementations are presented to explain improvements in wave generation technology.

Figure 1:
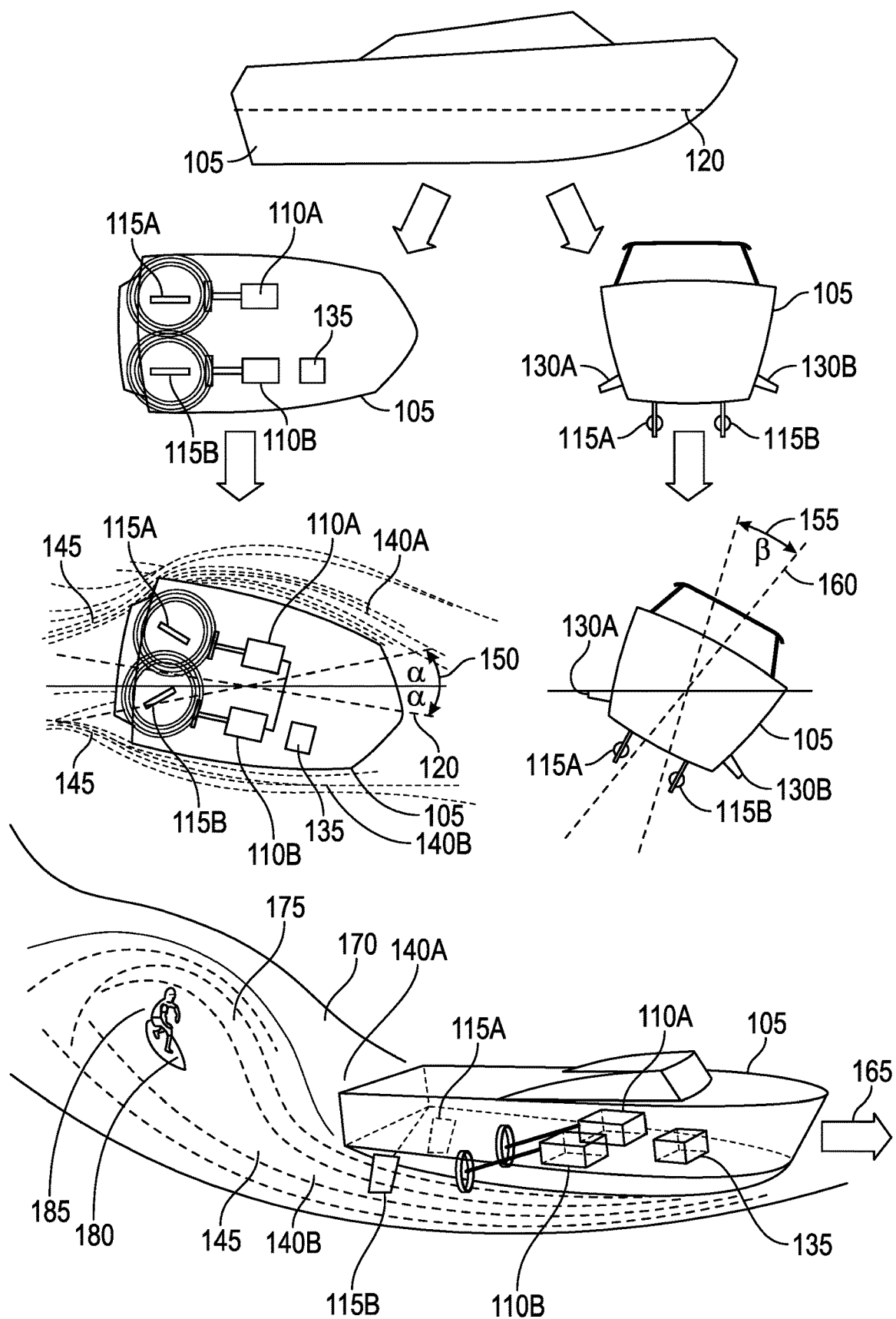
FIG. 1 depicts an exemplary scenario generating a wave based on adjusting control surfaces and differential thrust vector propulsion configured in a machine to create different rate flows separated by the machine based on the machine's yaw slip angle as the machine moves in water, and directing the flows to converge and form a wave trailing the machine.

FIG. 1 depicts an exemplary scenario generating a wave based on adjusting control surfaces and differential thrust vector propulsion configured in a machine to create different rate flows separated by the machine based on the machine's yaw slip angle as the machine moves in water, and directing the flows to converge and form a wave trailing the machine. In FIG. 1, the machine 105 is a watercraft configured with the propulsion method 110A and the propulsion method 110B. In the illustrated example, the thrust magnitude and thrust direction of the propulsion method 110A and the propulsion method 110B are independently adjustable. In an illustrative example, setting the propulsion method 110A thrust vector to a value distinct from the propulsion method 110B thrust vector creates a differential thrust vector propulsion system formed from the propulsion method 110A and the propulsion method 110B. In the depicted example, the machine 105 is configured with the control surface 115A and the control surface 115B. In the depicted example, the control surface 115A and the control surface 115B are disposed aft of the propulsion method 110A and the propulsion method 110B. The propulsion method 110A may be a motor or a thruster pod. The propulsion method 110B may be a motor or a thruster pod. In the depicted example, the propulsion method 110A and the propulsion method 110B are motors each configured with a propeller coupled to the motor by a drive shaft. The motors may be electric motors. In the illustrated example, the control surface 115A and the control surface 115B are independently rotatably adjustable in the plane of the machine longitudinal axis 120. The control surface 115A and the control surface 115B may be independently rotatably adjustable 360 degrees in the plane of the machine longitudinal axis 120. In the illustrated example, machine 105 is configured with the control surface 130A and the control surface 130B. In the depicted example, the control surface 130A and the control surface 130B are each disposed in one watercraft machine 105 side. In the illustrated example, the control surface 130A and the control surface 130B are each disposed in one watercraft machine 105 side aft of the propulsion method 110A and the propulsion method 110B. The control surface 130A may be a fin or a foil. The control surface 130A may be configured to rotate in the plane of the watercraft machine 105 vertical axis. The control surface 130B may be a fin or a foil. The control surface 130B may be configured to rotate in the plane of the watercraft machine 105 vertical axis. In the depicted example, the machine 105 is configured with the control system 135. In an illustrative example, the control surfaces' positions and angles are adjustable by the control system 135. In the depicted implementation, the control system 135 is operably coupled with and configured to govern the operation of the propulsion methods and the control surfaces to create different rate flows comprising the flow high side 140A and the flow low side 140B. In the illustrated implementation, the flow high side 140A and the flow low side 140B are separated by the machine 105 based on the machine 105 yaw slip angle 150 relative to the machine longitudinal axis 120, and the machine roll angle 155 relative to the machine 105 vertical axis 160, as a result of the machine 105 forward motion 165 in the water. In an illustrative example, the high side 140A flow rate and the low side 140B flow rate may be determined by the control system 135 as a function of flow rate measurements by a low side flow rate sensor and a high side flow rate sensor. The low side flow rate sensor and the high side flow rate sensor may be disposed on respective sides of the machine 105 and each flow rate sensor configured in a tube open to the water flow along the sides. The machine 105 yaw slip angle 150 and roll angle 155 may be determined by the control system 135 as a function of accelerometer information. In the depicted example, the flow high side 140A flow rate is higher relative to the flow low side 140B flow rate, as a result of the flow separation by the machine 105 operating as a foil with a variable angle of attack based on the yaw slip angle 150. In the illustrated example, the control system 135 manipulates the propulsion system differential thrust vector and the positions and/or angles of the control surfaces to direct the flow high side 140A and the flow low side 140B to converge in the wake 145 and form the wave 170 trailing the machine 105. The angled control surfaces change the pitch and roll aspects of the machine 105, improving the quality of the wave 170 surface 175 created by the machine 105 in the water flowing behind the machine 105. In the depicted example, the wave 170 provides the enhanced wave surface 175 with increased wave energy and higher flow rate for the wakeboard 180 used by the wakesurfer 185, based on the control system 135 actively governing control surfaces and differential thrust, and thrust vectoring, to redirect water flow to converge with other portions of the water trailing the machine 105.

Figure 2A:
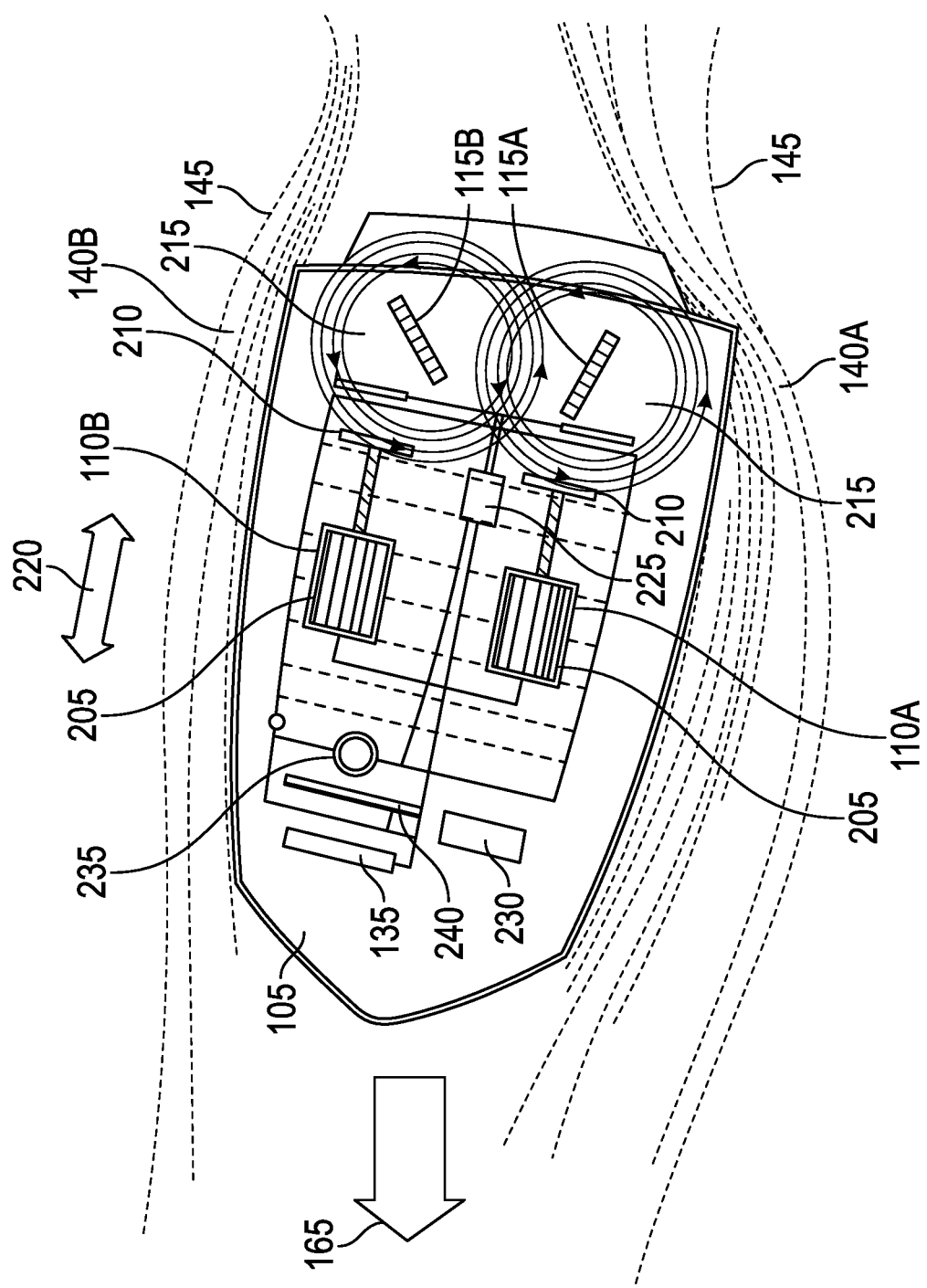
FIGS. 2A-2C depict top views of an exemplary wave generation system.
Figure 2B:
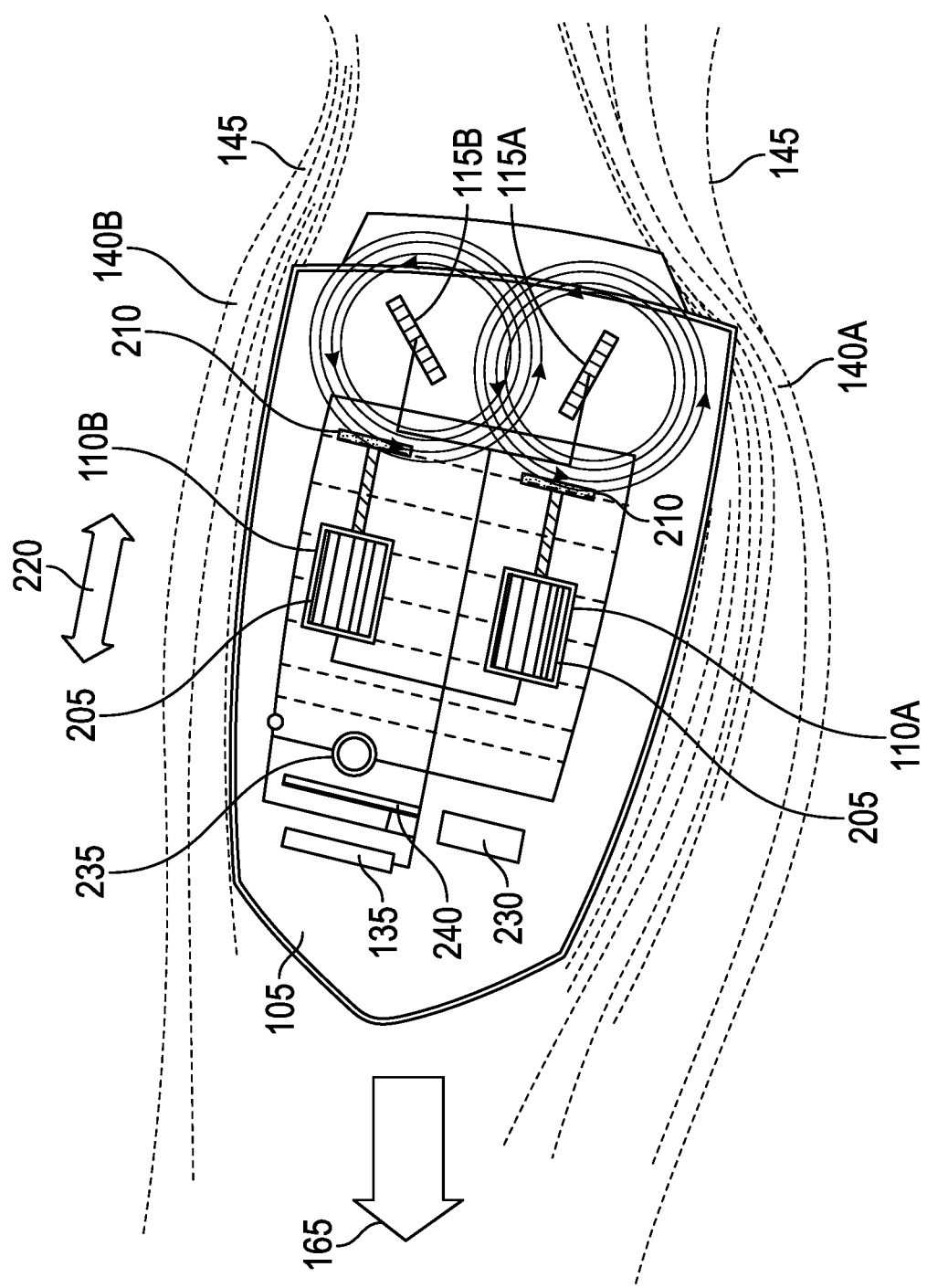
Figure 2C:
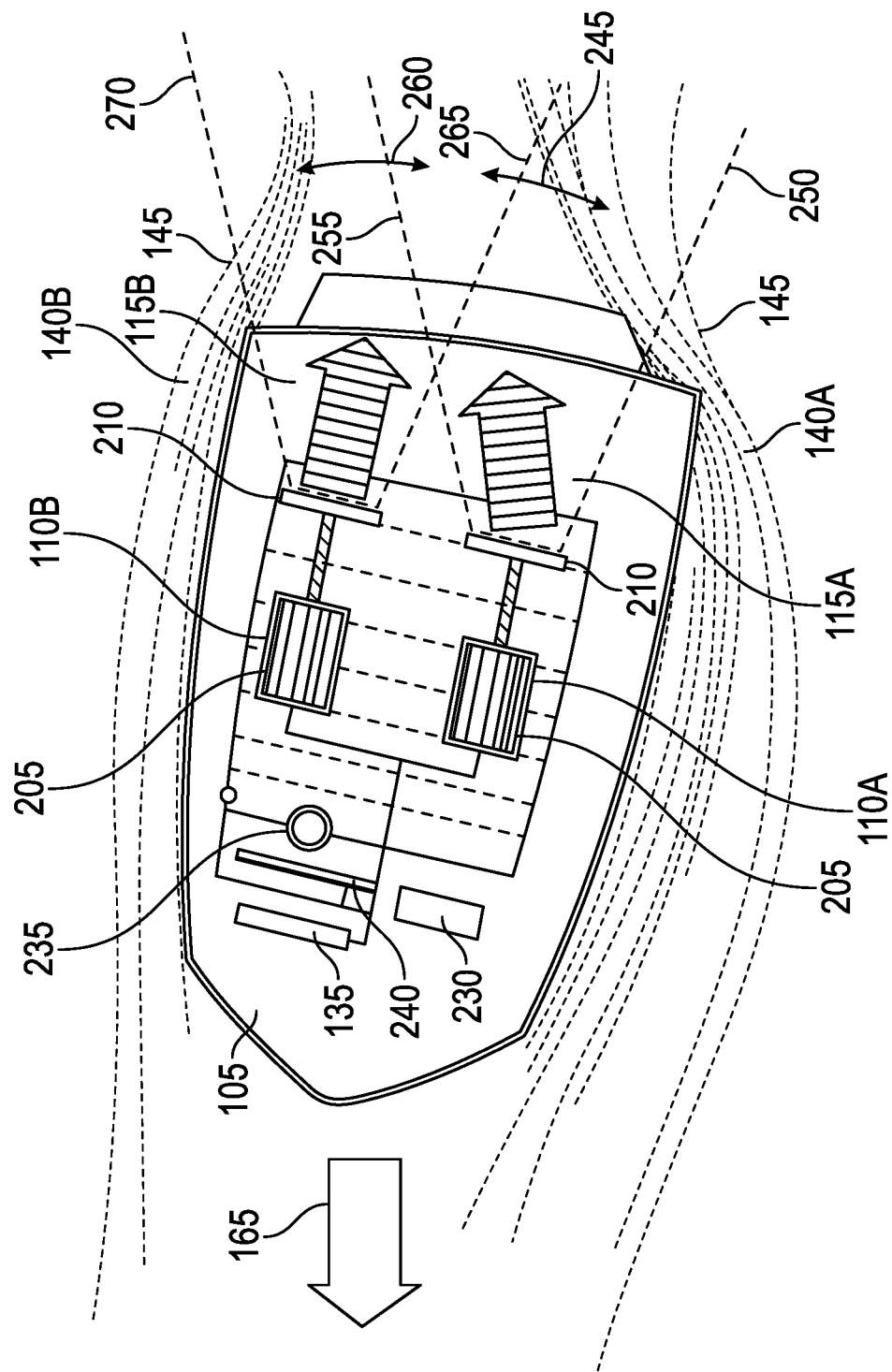

FIGS. 2A-2C depict top views of an exemplary wave generation system. In FIG. 2A, the depicted machine 105 propulsion method 110A includes the motor 205 coupled by a driveshaft with the propeller 210. In the depicted implementation, the machine 105 propulsion method 110B includes the motor 205 coupled by a driveshaft with the propeller 210. In the illustrated implementation, the position of control surface 115A is governed by the hydraulic cylinder 215 operated by the control system 135. In the depicted implementation, the position of control surface 115B is governed by the hydraulic cylinder 215 operated by the control system 135. The control system 135 generates a wave by directing water flow resulting from the propulsion method 110A and propulsion method 110B thrust 220 to converge with other portions of the water trailing the machine 105, based on adjusting the position of control surface 115A and control surface 115B using the hydraulic cylinders 215 powered by the hydraulic pump 225. The depicted wave generation implementation also includes the battery management system 230 configured to provide instrumentation and control interfaces for a battery and charging system adapted to provide electric power to the wave generation system. In the illustrated implementation, the exemplary wave generation system includes the helm station 235 and the interface/display 240 each operably coupled with the control system 135, and configured to facilitate operation of the machine 105.

In the exemplary wave generation system implementation depicted by FIG. 2B, the position of control surface 115A is governed by an electric servo motor operated by the control system 135. In the depicted implementation, the position of control surface 115B is governed by an electric servo motor operated by the control system 135. In the illustrated implementation, the propulsion method 110A thrust vector direction is governed by an electric servo motor operated by the control system 135. In the depicted implementation, the propulsion method 110B thrust vector direction is governed by an electric servo motor operated by the control system 135. In the depicted example, the propulsion method 110A and the propulsion method 110B are electric motors. The electric motors are operably coupled with the control system 135 that independently governs the electric motors' speeds. The control system 135 generates a wave by directing water flow resulting from the propulsion method 110A and propulsion method 110B thrust 220 to converge with other portions of the water trailing the machine 105, based on adjusting the position of control surface 115A and control surface 115B using the electric servo motors operably coupled with the control system 135. In an illustrative example, the wave generation implementation depicted by FIG. 2B omits hydraulic system components that may govern propulsion method thrust vector direction or control surface position in other designs.

In the exemplary wave generation system implementation illustrated by FIG. 2C, the propulsion method 110A thrust vector direction is adjustable by the control system 135 through the depicted propulsion method thrust vector range 245 between the propulsion method thrust vector range limit 250 and the propulsion method thrust vector range limit 255. In the depicted implementation, the propulsion method 110B thrust vector direction is adjustable by the control system 135 through the depicted propulsion method thrust vector range 260 between the propulsion method thrust vector range limit 265 and the propulsion method thrust vector range limit 270. In the depicted implementation, the propulsion method 110A thrust vector direction may be adjustable by the control system 135 using a hydraulic cylinder or an electric servo motor operably coupled with the control system 135 to govern the propulsion method 110A thrust vector direction. In the illustrated implementation, the propulsion method 110B thrust vector direction may be adjustable by the control system 135 using a hydraulic cylinder or an electric servo motor operably coupled with the control system 135 to govern the propulsion method 110B thrust vector direction. An exemplary propulsion method may include a housing configured with a movable control surface in the form of a cone or nozzle that subsumes, or partially houses, the propulsion method to direct the propulsion method's thrust. For example, such a housing may be a rudder cone configured to rotate 360 degrees to direct propulsion method thrust as the rudder cone moves around the propulsion method.

Figure 3:
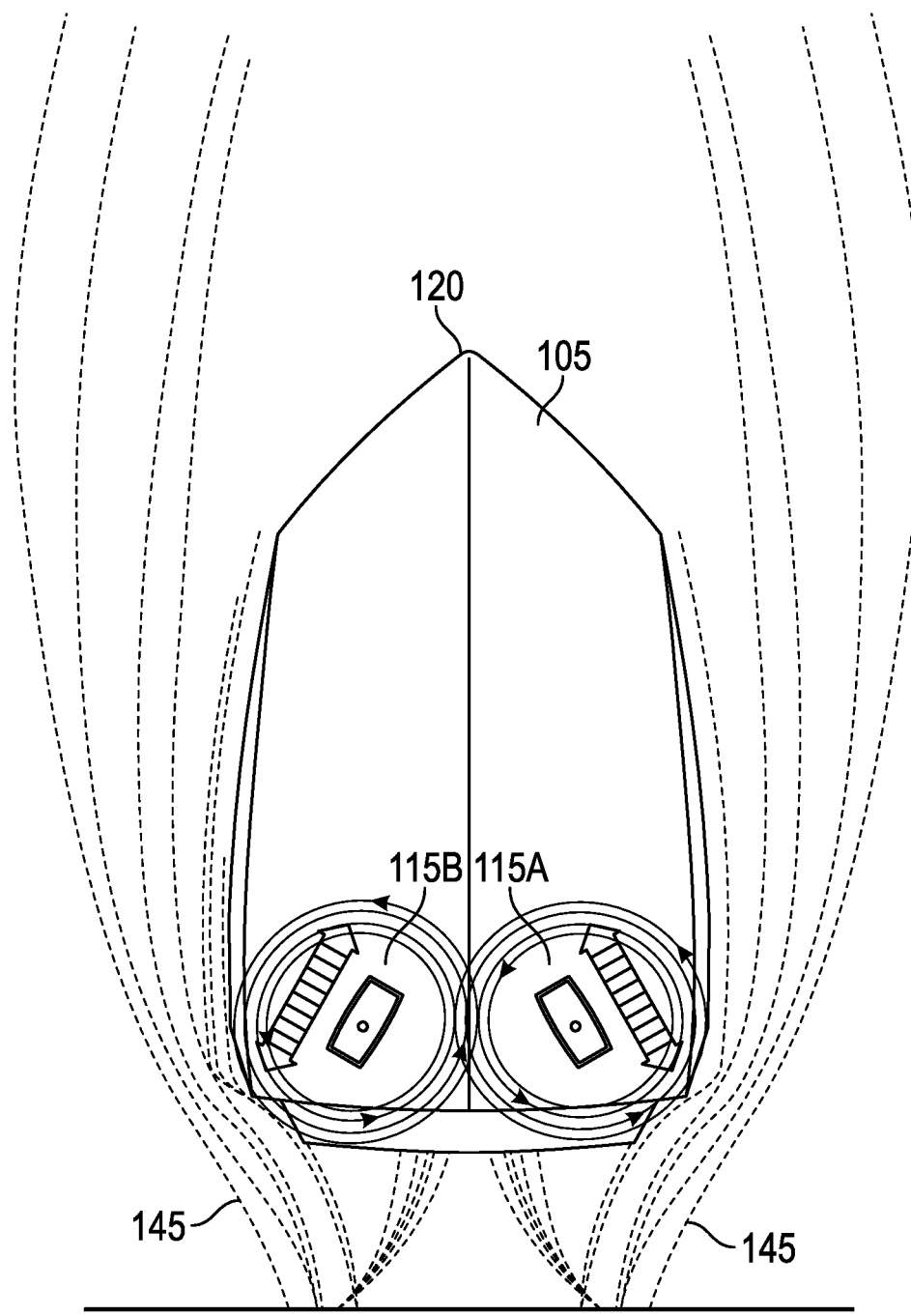
FIG. 3 depicts a bottom view of an exemplary wave generation system.

FIG. 3 depicts a bottom view of an exemplary wave generation system. In FIG. 3, the depicted wave generation machine 105 includes the control surface 115A and the control surface 115B. In the illustrated implementation, the control surface 115A and the control surface 115B are independently rotatably adjustable 360 degrees in the plane of the wave generation machine 105 longitudinal axis 120.

Figure 4:
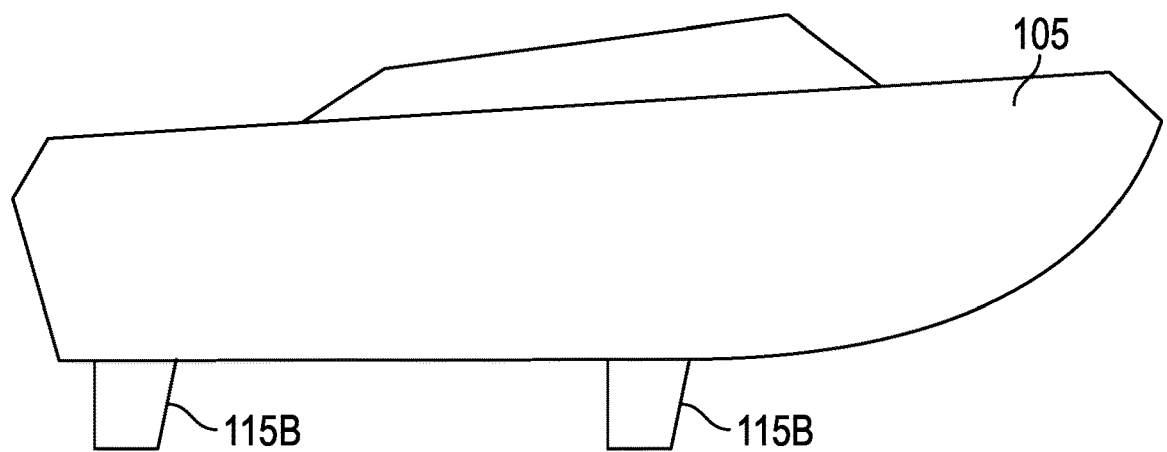
FIG. 4 depicts a side view of an exemplary wave generation system.

FIG. 4 depicts a side view of an exemplary wave generation system. In FIG. 4, the exemplary wave generation machine 105 side view depicts forward and aft control surfaces 115B disposed in the wave generation machine 105 hull off-center from the wave generation machine 105 longitudinal axis. In the depicted example, each control surface 115B may be a fin, a foil, or a rudder. Each control surface 115B may be configured to pivot side to side in the plane of the horizon. Each control surface 115B may be configured to rotate in the plane of the wave generation machine 105 longitudinal axis. The depicted implementation also includes forward and aft control surfaces 115A (not visible) disposed in the wave generation machine 105 hull off-center from the wave generation machine 105 longitudinal axis and opposite from and having the same features as the forward and aft control surfaces 115B.

Figure 5A:
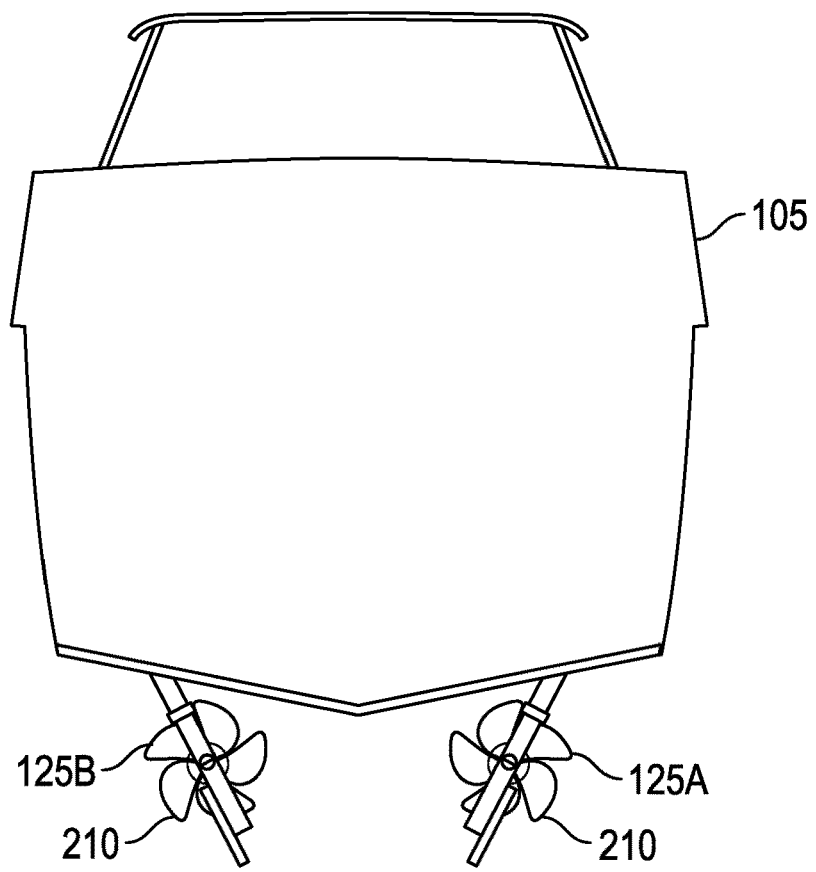
FIGS. 5A-5D depict exemplary wave generation system control surface configurations.

FIGS. 5A-5D depict exemplary wave generation system control surface configurations. In FIG. 5A, the depicted exemplary wave generation machine 105 front view includes the control surface 125A and the control surface 125B each configured with an exemplary propulsion method comprising the propeller 210. In the illustrated implementation, the control surface 125A and the control surface 125B are configured to pivot side to side in the plane of the horizon. The control surface 125A and the control surface 125B may be configured to rotate in the plane of the wave generation machine 105 longitudinal axis. The control surface 125A may be operably coupled with a control system and a hydraulic cylinder or electric servo motor governing the position of the control surface 125A. The control surface 125B may be operably coupled with a control system and a hydraulic cylinder or electric servo motor governing the position of the control surface 125B. In the depicted implementation, the control surface 125A and the control surface 125B are illustrated as configured in an exemplary toe-in mode to slow the wave generation machine 105 based on increasing resistance to the wave generation machine 105 movement in water.

Figure 5B:
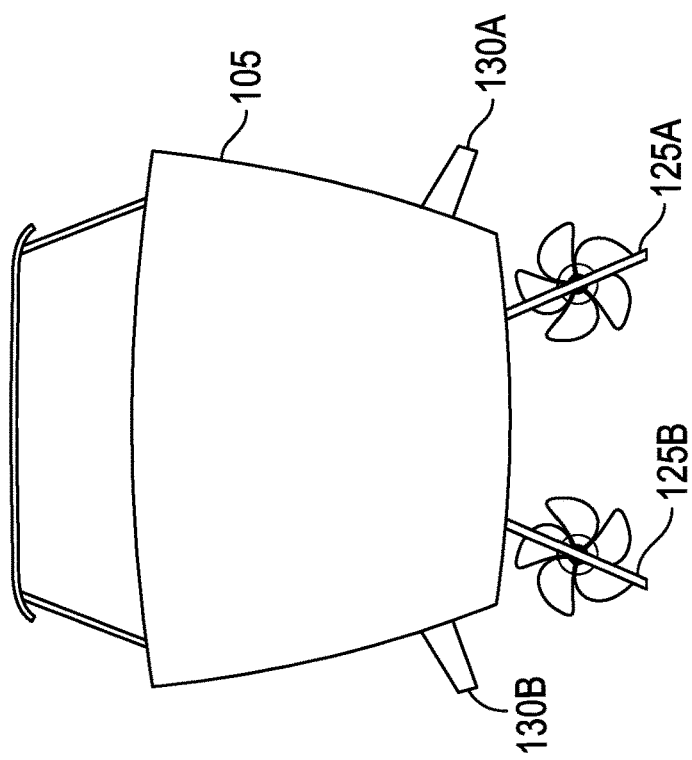
Figure 5B:
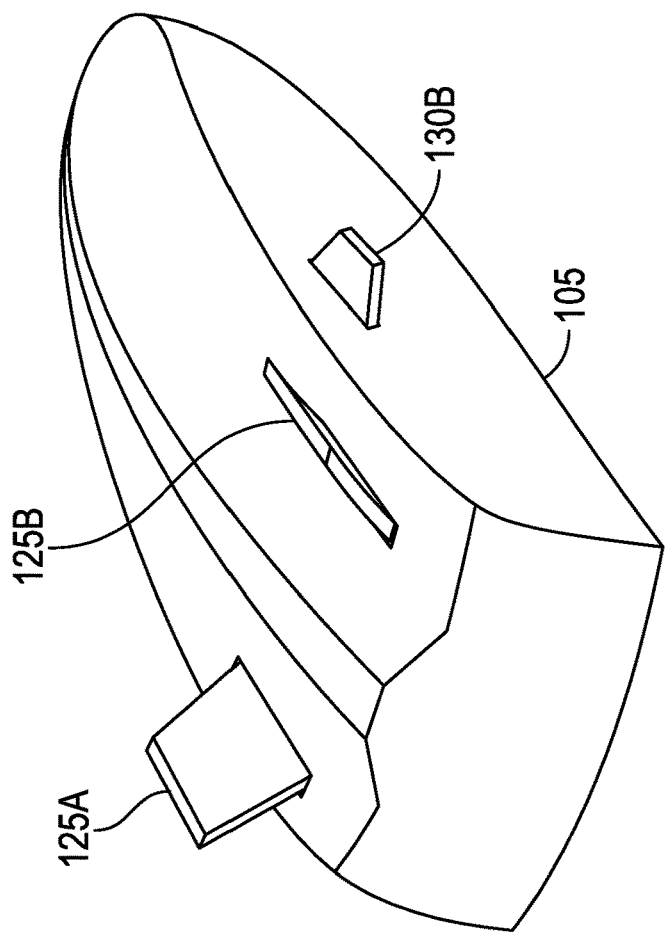

In FIG. 5B, the illustrated exemplary wave generation machine 105 includes the control surface 125A and the control surface 125B illustrated as configurable in exemplary toe-in and toe-out modes. The exemplary toe-out mode permits increased wave generation machine 105 speed in water relative to the exemplary toe-in mode. The illustrated exemplary wave generation machine 105 includes the control surface 130A and the control surface 130B. The control surface 130A disposed in the machine 105 side may be a fin, or a foil. The control surface 130A may be configured to rotate in the plane of the vertical axis of the machine 105. The control surface 130A may be operably coupled with a control system and a hydraulic cylinder or electric servo motor governing the position of the control surface 130A. The control surface 130B disposed in the machine 105 side may be a fin, or a foil. The control surface 130B may be configured to rotate in the plane of the vertical axis of the machine 105. The control surface 130B may be operably coupled with a control system and a hydraulic cylinder or electric servo motor governing the position of the control surface 130B.

Figure 5C:
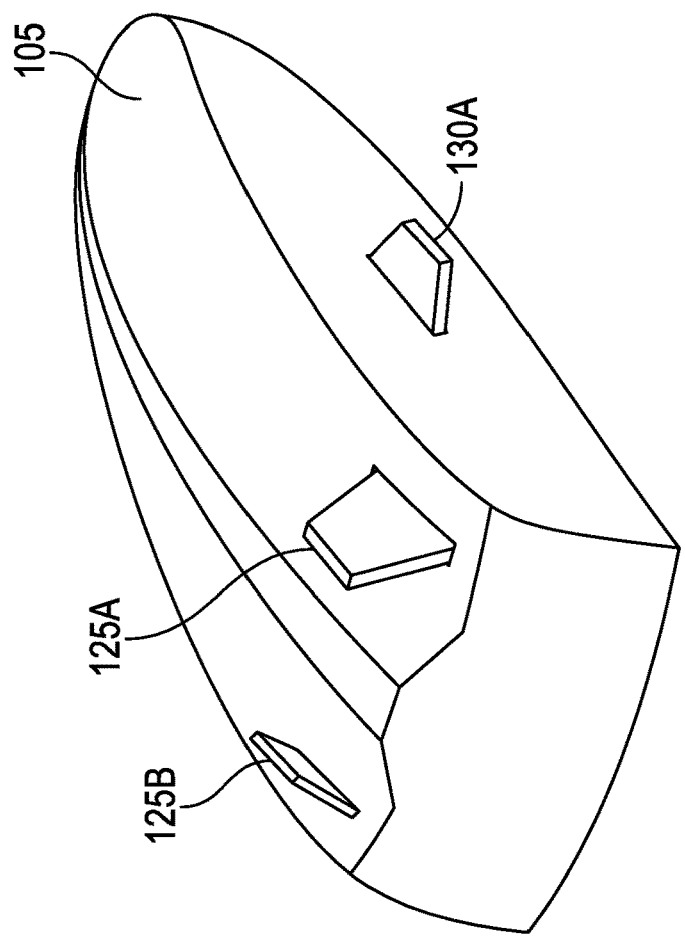
Figure 5C:
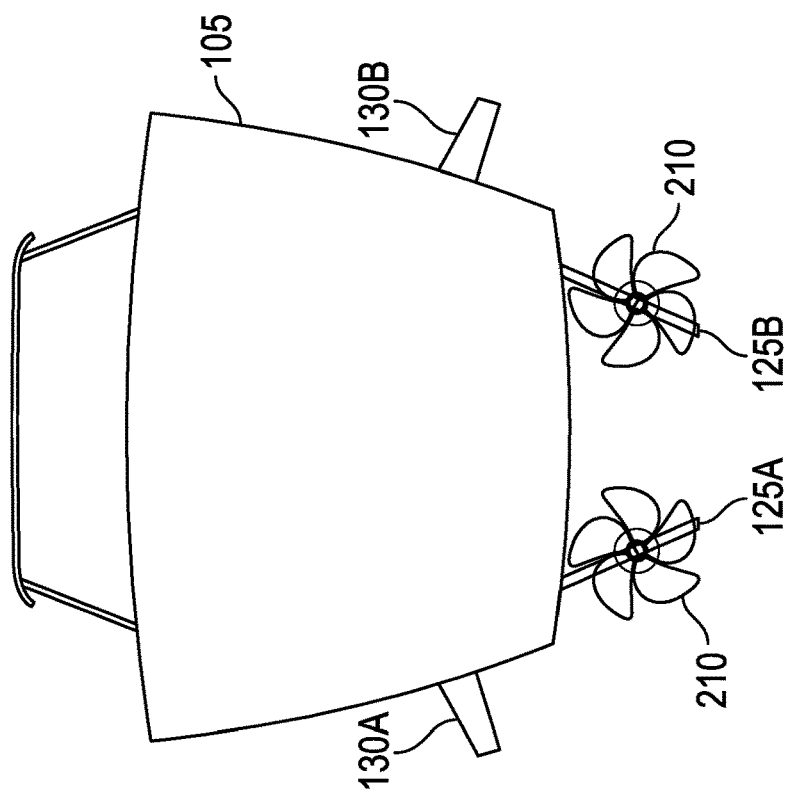

In FIG. 5C, the illustrated exemplary wave generation machine 105 includes the control surface 125A and the control surface 125B illustrated as configured in the exemplary toe-in mode described at least with reference to FIG. 5B.

Figure 5D:
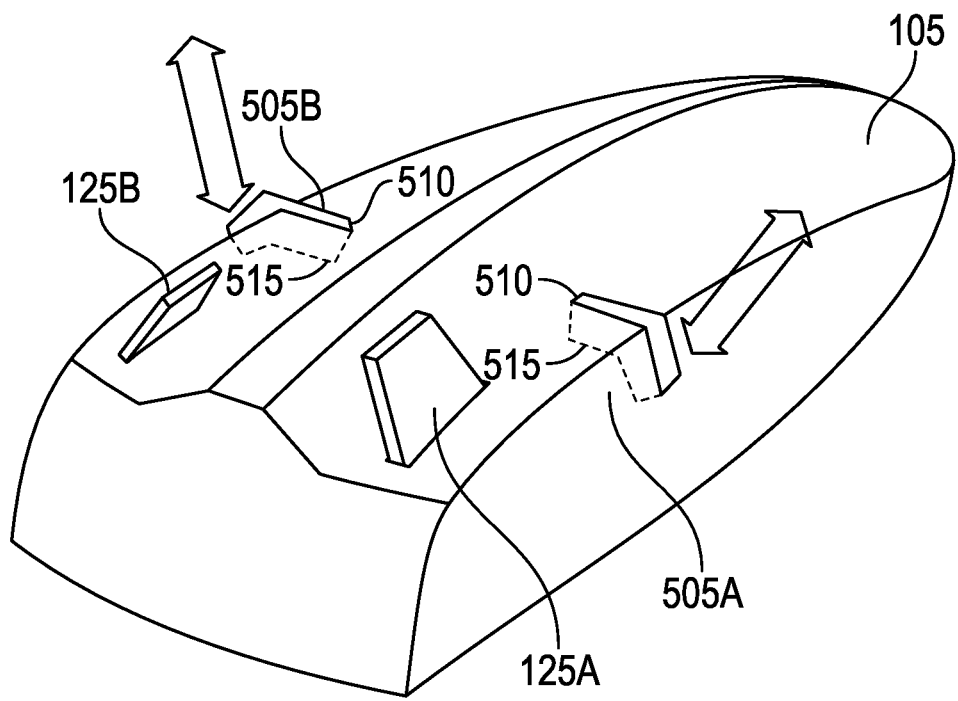
Figure 5D:
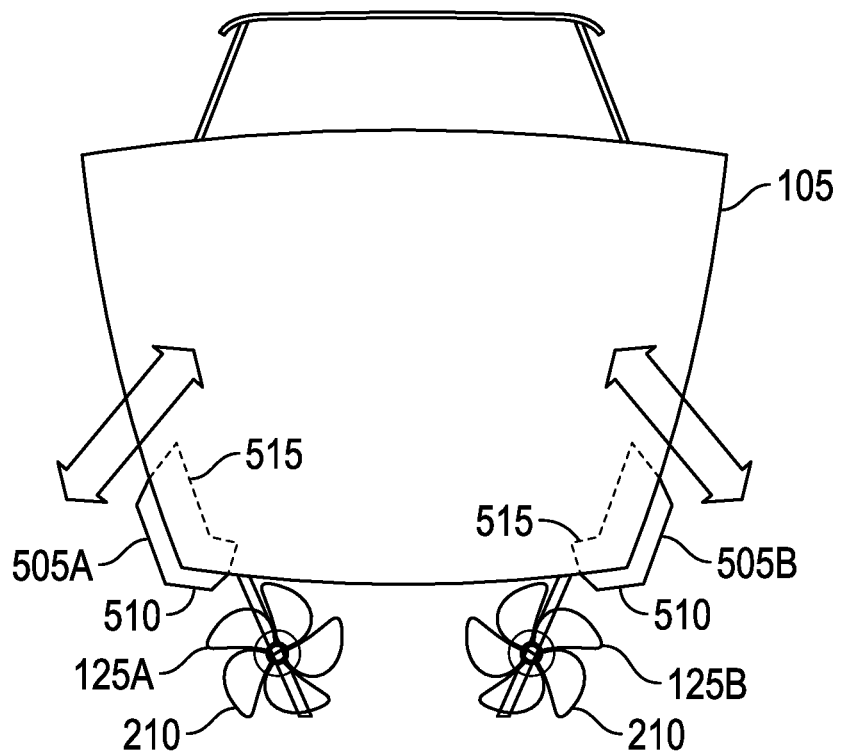

In FIG. 5D, the depicted exemplary wave generation machine 105 includes the control surface 505A and the control surface 505B. In the depicted implementation, the control surface 505A is a retractable tab. In the illustrated example, the control surface 505A is positioned and mounted to the hull bottom and side. In the depicted example, the control surface 505A is extendable to the tab extended 510 position from the tab retracted 515 position. The control surface 505A may be disposed flush with the hull in the tab retracted 515 position. The control surface 505A may be operably coupled with a control system and a hydraulic cylinder or an electric servo motor governing the position of control surface 505A. In the illustrated implementation, the control surface 505B is a retractable tab. In the illustrated example, the control surface 505B is positioned and mounted to the hull bottom and side. In the depicted example, the control surface 505B is extendable to the tab extended 510 position from the tab retracted 515 position. The control surface 505B may be disposed flush with the hull in the tab retracted 515 position. The control surface 505B may be operably coupled with a control system and a hydraulic cylinder or an electric servo motor governing the position of control surface 505B. The control system may be configured to independently retract or extend control surface 505A or control surface 505B. For example, the control surface 505A position and the control surface 505B position may each be independently adjustable by the control system to positions distinct from one another. The control system may be configured to independently retract or extend control surface 505A or control surface 505B to various positions on a continuum between the tab extended 510 position and the tab retracted 515 position.

Figure 6:
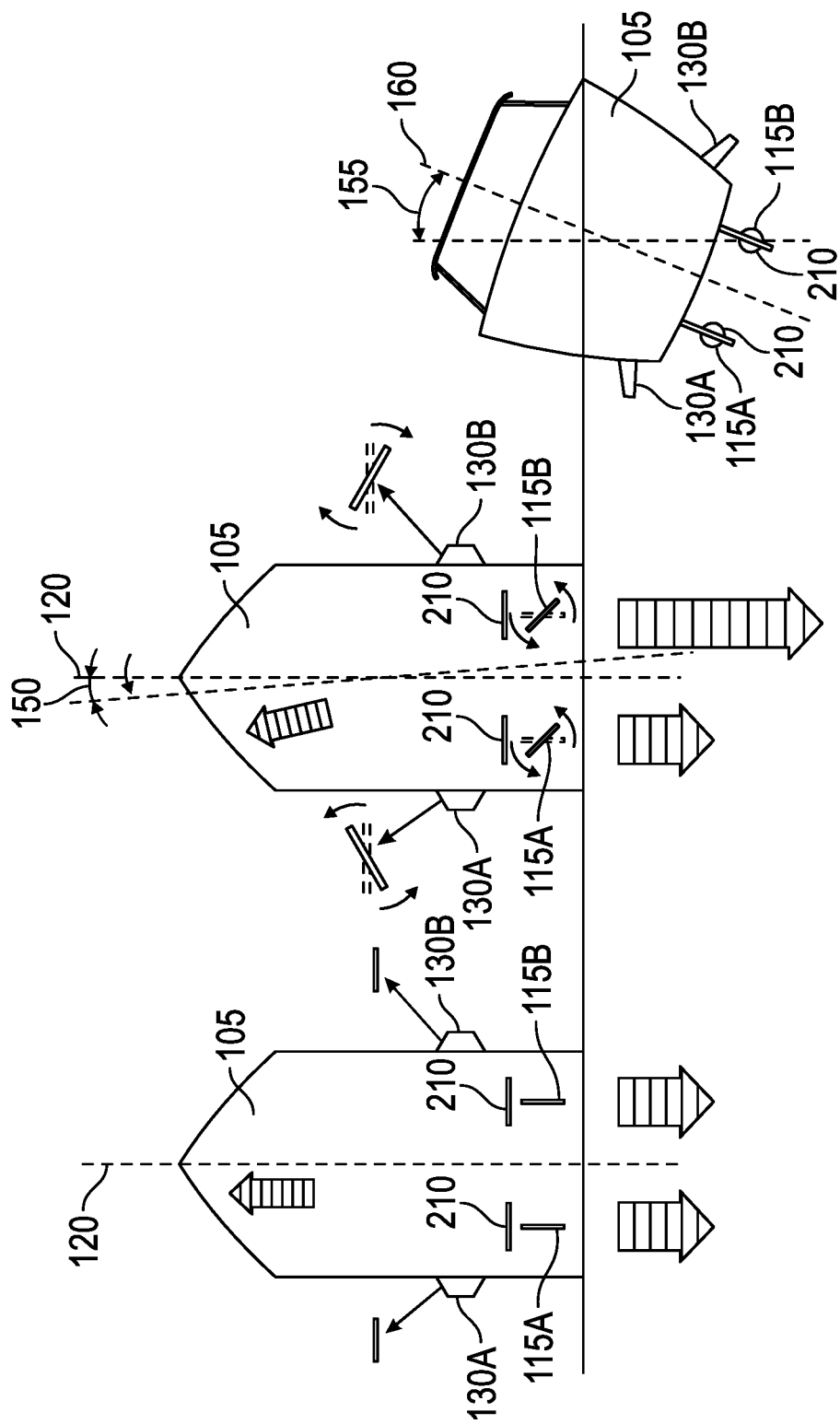
FIG. 6 depicts operation of an exemplary wave generation system control surface and propulsion system configuration.

FIG. 6 depicts operation of an exemplary wave generation system control surface and propulsion system configuration. The exemplary wave generation system control surface and propulsion system configuration depicted by FIG. 6 includes the two propulsion methods each comprising one of the propellers 210 disposed off-center from the wave generation machine 105 longitudinal axis 120. The depicted configuration also includes the control surfaces 115A and 115B disposed off-center from the wave generation machine longitudinal axis 120 and aft of the propulsion methods. The illustrated configuration also includes the two foil control surfaces 130A and 130B disposed at the machine 105 sides and forward of the propulsion methods. In the depicted example, the propulsion methods and control surfaces are governed by a control system configured in the machine 105. In the illustrated example, the wave generation scenario begins with the machine 105 control system configuring equal thrust by the propulsion methods, straight control surfaces, and level foils, resulting in a straight initial trajectory by the wave generation machine 105. In the depicted example scenario, the control system increases thrust on the right propulsion method, rotates the right and/or left control surface, and rotates right and/or left foils/control surfaces, to change the yaw slip angle 150 and the roll angle 155, and create a desirable surface for surfing behind the machine 105 on one side. In an illustrative example, the control system may switch the control surface positions and/or thrust power settings, from one side to the other, to create a desirable surface for surfing on the opposite side of the machine.

Figure 7:
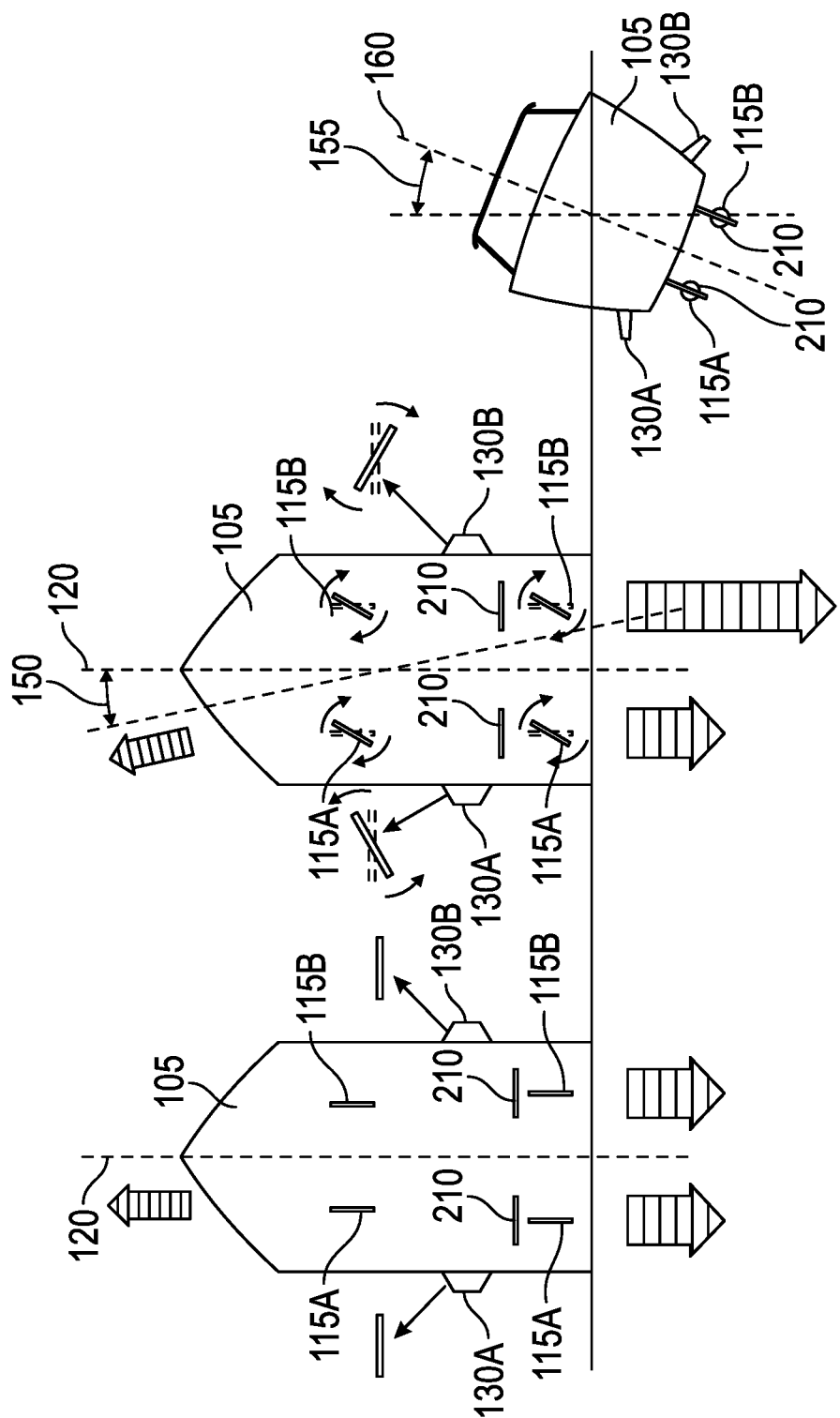
FIG. 7 depicts operation of an exemplary wave generation system control surface and propulsion system configuration.

FIG. 7 depicts operation of an exemplary wave generation system control surface and propulsion system configuration. The exemplary wave generation system control surface and propulsion system configuration illustrated by FIG. 7 includes the two propulsion methods each comprising one of the propellers 210 disposed off-center from the wave generation machine 105 longitudinal axis 120. The depicted configuration also includes the aft control surfaces 115A and 115B disposed off-center from the wave generation machine longitudinal axis 120 and aft of the propulsion methods. The illustrated configuration also includes the forward control surfaces 115A and 115B disposed off-center from the wave generation machine longitudinal axis 120 and forward of the propulsion methods. The illustrated configuration also includes the two foil control surfaces 130A and 130B disposed at the machine 105 sides and forward of the propulsion methods. In the depicted example, the propulsion methods and control surfaces are governed by a control system configured in the machine 105. In the illustrated example, the wave generation scenario begins with the machine 105 control system configuring equal thrust by the propulsion methods, straight control surfaces, and level foils, resulting in a straight and level initial trajectory by the wave generation machine 105. In the depicted example scenario, the control system increases thrust on the right propulsion method, rotates the right and/or left aft and/or forward control surfaces, and rotates right and/or left foil/control surfaces, to change the yaw slip angle 150 and the roll angle 155, and create a desirable surface for surfing behind the machine 105 on one side. In an illustrative example, the control system may switch the control surface positions and/or thrust power settings, from one side to the other, to create a desirable surface for surfing on the opposite side of the machine.

Figure 8:
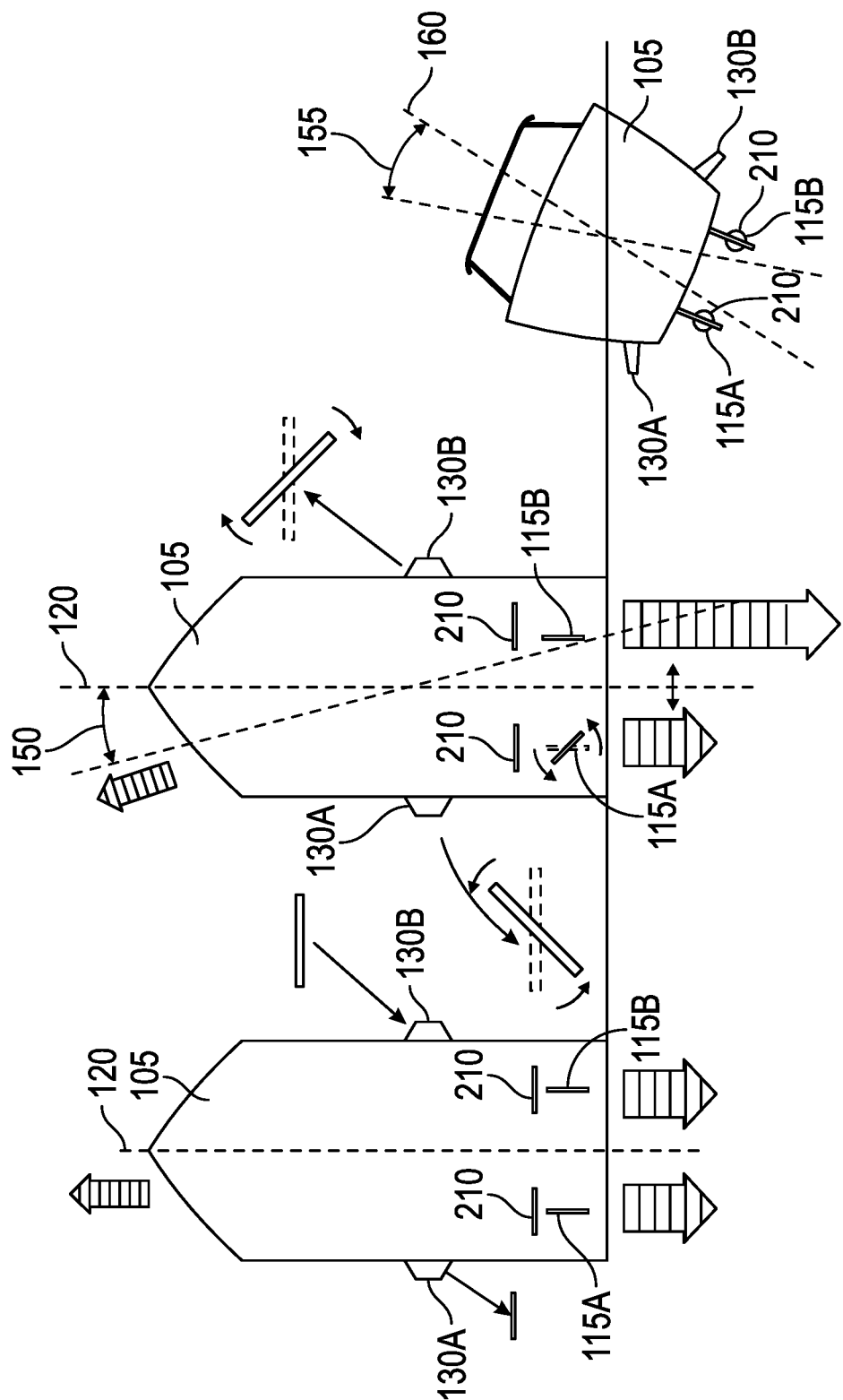
FIG. 8 depicts operation of an exemplary wave generation system control surface and propulsion system configuration.

FIG. 8 depicts operation of an exemplary wave generation system control surface and propulsion system configuration.

The exemplary wave generation system control surface and propulsion system configuration depicted by FIG. 8 includes the two propulsion methods each comprising one of the propellers 210 disposed off-center from the wave generation machine 105 longitudinal axis 120. The depicted configuration also includes the control surfaces 115A and 115B disposed off-center from the wave generation machine longitudinal axis 120 and aft of the propulsion methods. The illustrated configuration also includes the two foil control surfaces 130A and 130B disposed at the machine 105 sides and forward of the propulsion methods. In the depicted example, the propulsion methods and control surfaces are governed by a control system configured in the machine 105. In the illustrated example, the wave generation scenario begins with the machine 105 control system configuring equal thrust by the propulsion methods, straight control surfaces, and level foils, resulting in a straight and level initial trajectory by the wave generation machine 105. In the depicted example scenario, the control system increases thrust on the right propulsion method, rotates the left control surface counter-clockwise, and rotates right and/or left foils/control surfaces, to change the yaw slip angle 150 and the roll angle 155, and create a desirable surface for surfing behind the machine 105 on one side. In an illustrative example, the control system may switch the control surface positions and/or thrust power settings, from one side to the other, to create a desirable surface for surfing on the opposite side of the machine.

Figure 9:
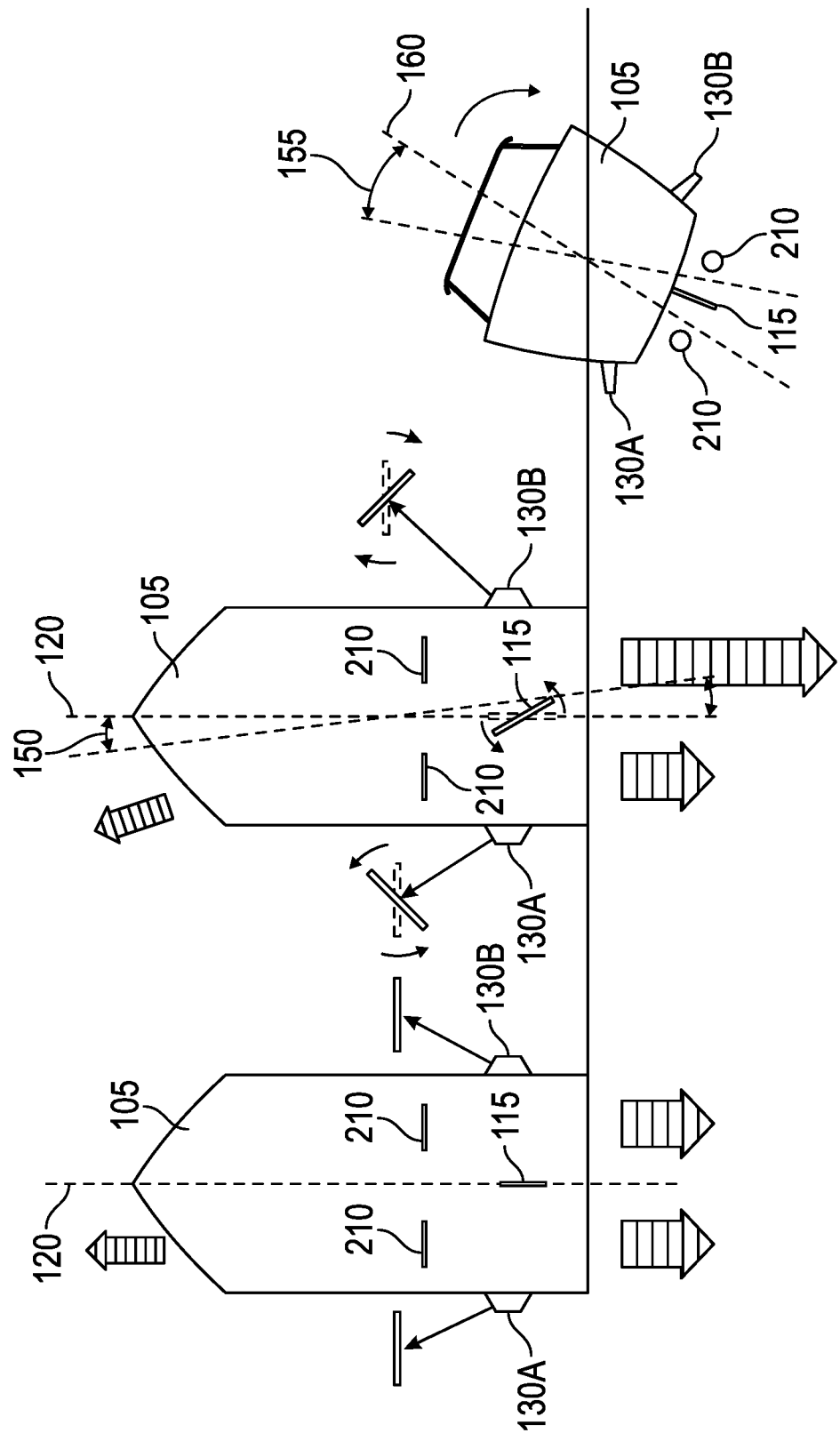
FIG. 9 depicts operation of an exemplary wave generation system control surface and propulsion system configuration.

FIG. 9 depicts operation of an exemplary wave generation system control surface and propulsion system configuration. The exemplary wave generation system control surface and propulsion system configuration depicted by FIG. 9 includes the two propulsion methods each comprising one of the propellers 210 disposed off-center from the wave generation machine 105 longitudinal axis 120. The depicted configuration also includes the control surface 115 disposed in line with the wave generation machine longitudinal axis 120 and aft of the propulsion methods. The illustrated configuration also includes the two foil control surfaces 130A and 130B disposed at the machine 105 sides and aft of the propulsion methods, substantially in line perpendicularly with the control surface 115 with respect to the wave generation machine longitudinal axis 120. In the depicted example, the propulsion methods and control surfaces are governed by a control system configured in the machine 105. In the illustrated example, the wave generation scenario begins with the machine 105 control system configuring equal thrust by the propulsion methods, straight control surfaces, and level foils, resulting in a straight and level initial trajectory by the wave generation machine 105. In the depicted example scenario, the control system increases thrust on the right propulsion method, rotates the control surface counter-clockwise, and rotates the right and/or left foils/control surfaces, to change the yaw slip angle 150 and the roll angle 155, and create a desirable surface for surfing behind the machine 105 on one side. In an illustrative example, the control system may switch the control surface positions and/or thrust power settings from one side to the other, to create a desirable surface for surfing on the opposite side of the machine.

Figure 10:
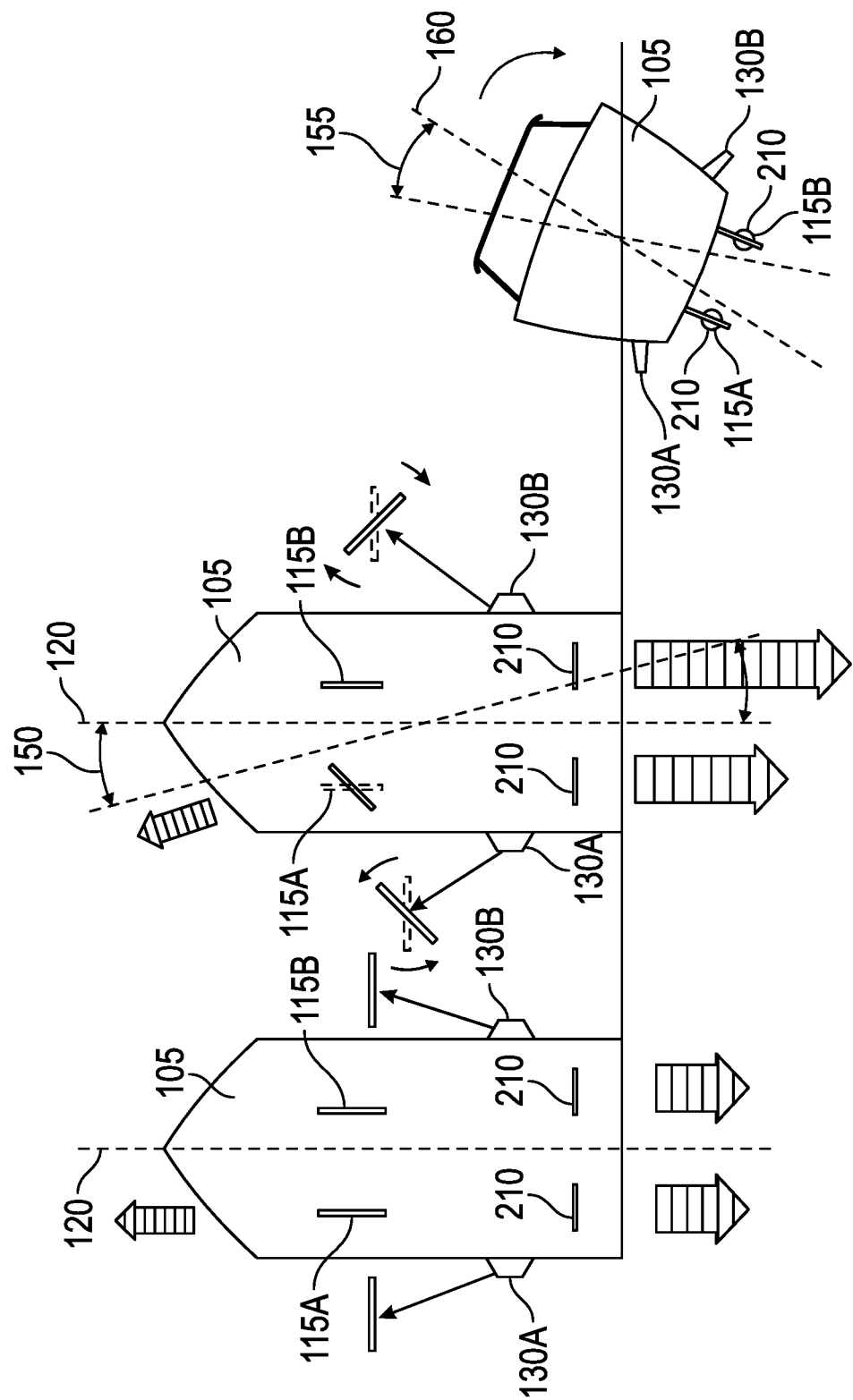
FIG. 10 depicts operation of an exemplary wave generation system control surface and propulsion system configuration.

FIG. 10 depicts operation of an exemplary wave generation system control surface and propulsion system configuration. The exemplary wave generation system control surface and propulsion system configuration depicted by FIG. 10 includes the two propulsion methods each comprising one of the propellers 210 disposed off-center from the wave generation machine 105 longitudinal axis 120. The depicted configuration also includes the control surfaces 115A and 115B disposed off-center from the wave generation machine longitudinal axis 120 and forward of the propulsion methods. The illustrated configuration also includes the two foil control surfaces 130A and 130B disposed at the machine 105 sides forward of the propulsion methods and aft of the control surfaces 115A and 115B. In the depicted example, the propulsion methods and control surfaces are governed by a control system configured in the machine 105. In the illustrated example, the wave generation scenario begins with the machine 105 control system configuring equal thrust by the propulsion methods, straight control surfaces, and level foils, resulting in a straight initial trajectory by the wave generation machine 105. In the depicted example scenario, the control system increases thrust on the right propulsion method, rotates the left control surface clockwise, and rotates right and/or left foils/control surfaces, to change the yaw slip angle 150 and the roll angle 155, and create a desirable surface for surfing behind the machine 105 on one side. In an illustrative example, the control system may switch the control surface positions and/or thrust power settings, from one side to the other, to create a desirable surface for surfing on the opposite side of the machine.

Figure 11:
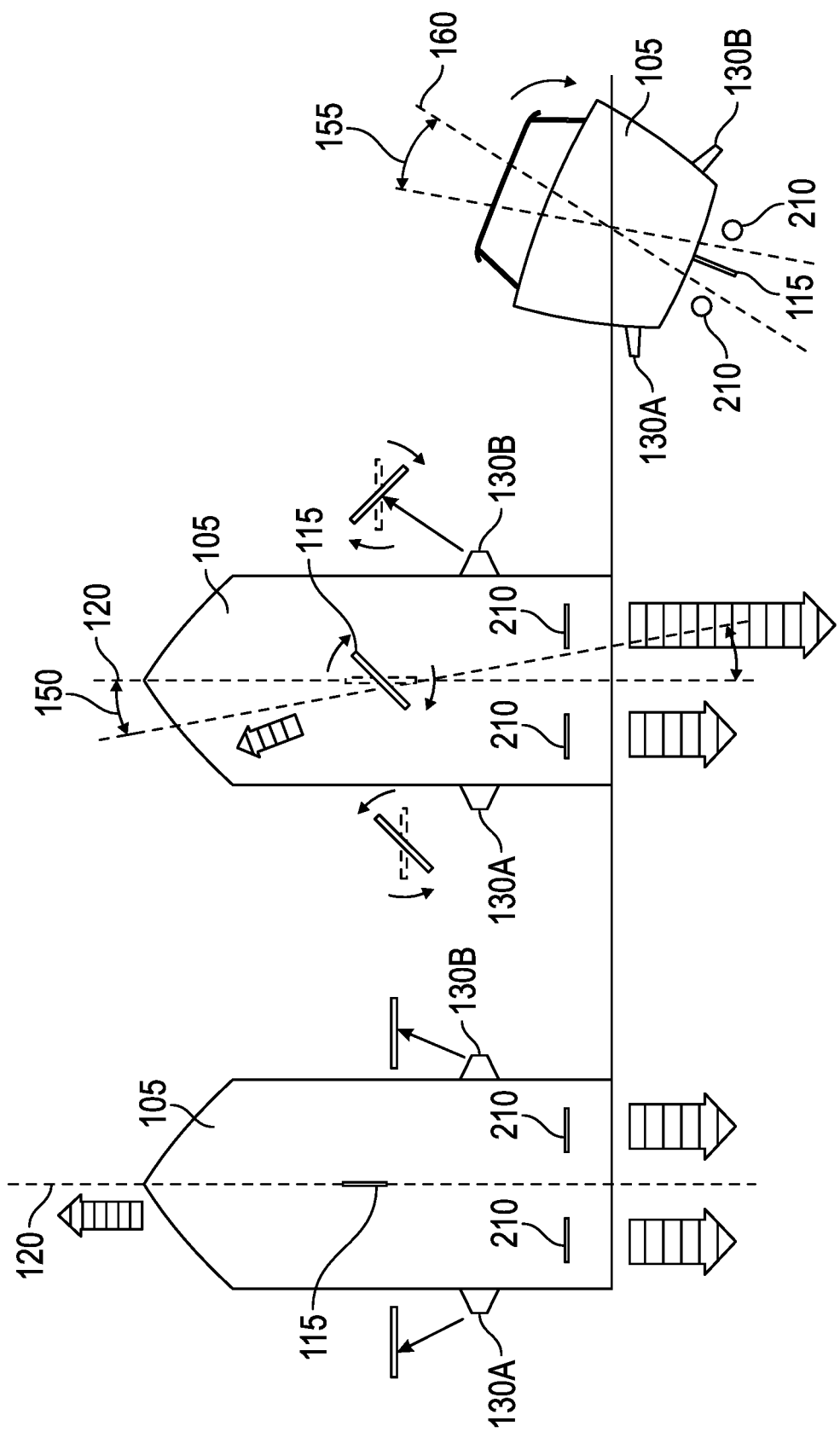
FIG. 11 depicts operation of an exemplary wave generation system control surface and propulsion system configuration.

FIG. 11 depicts operation of an exemplary wave generation system control surface and propulsion system configuration. The exemplary wave generation system control surface and propulsion system configuration depicted by FIG. 11 includes the two propulsion methods each comprising one of the propellers 210 disposed off-center from the wave generation machine 105 longitudinal axis 120. The depicted configuration also includes the control surface 115 disposed in line with the wave generation machine longitudinal axis 120 and forward of the propulsion methods. The illustrated configuration also includes the two foil control surfaces 130A and 130B disposed at the machine 105 sides aft of the control surface 115 and forward of the propulsion methods. In the depicted example, the propulsion methods and control surfaces are governed by a control system configured in the machine 105. In the illustrated example, the wave generation scenario begins with the machine 105 control system configuring equal thrust by the propulsion methods, straight control surfaces, and level foils, resulting in a straight and level initial trajectory by the wave generation machine 105. In the depicted example scenario, the control system increases thrust on the right propulsion method, rotates the control surface clockwise, and rotates the right and/or left foils/control surfaces, to change the yaw slip angle 150 and the roll angle 155, and create a desirable surface for surfing behind the machine 105 on one side. In an illustrative example, the control system may switch the control surface positions and/or thrust power settings from one side to the other, to create a desirable surface for surfing on the opposite side of the machine.

Figure 12:
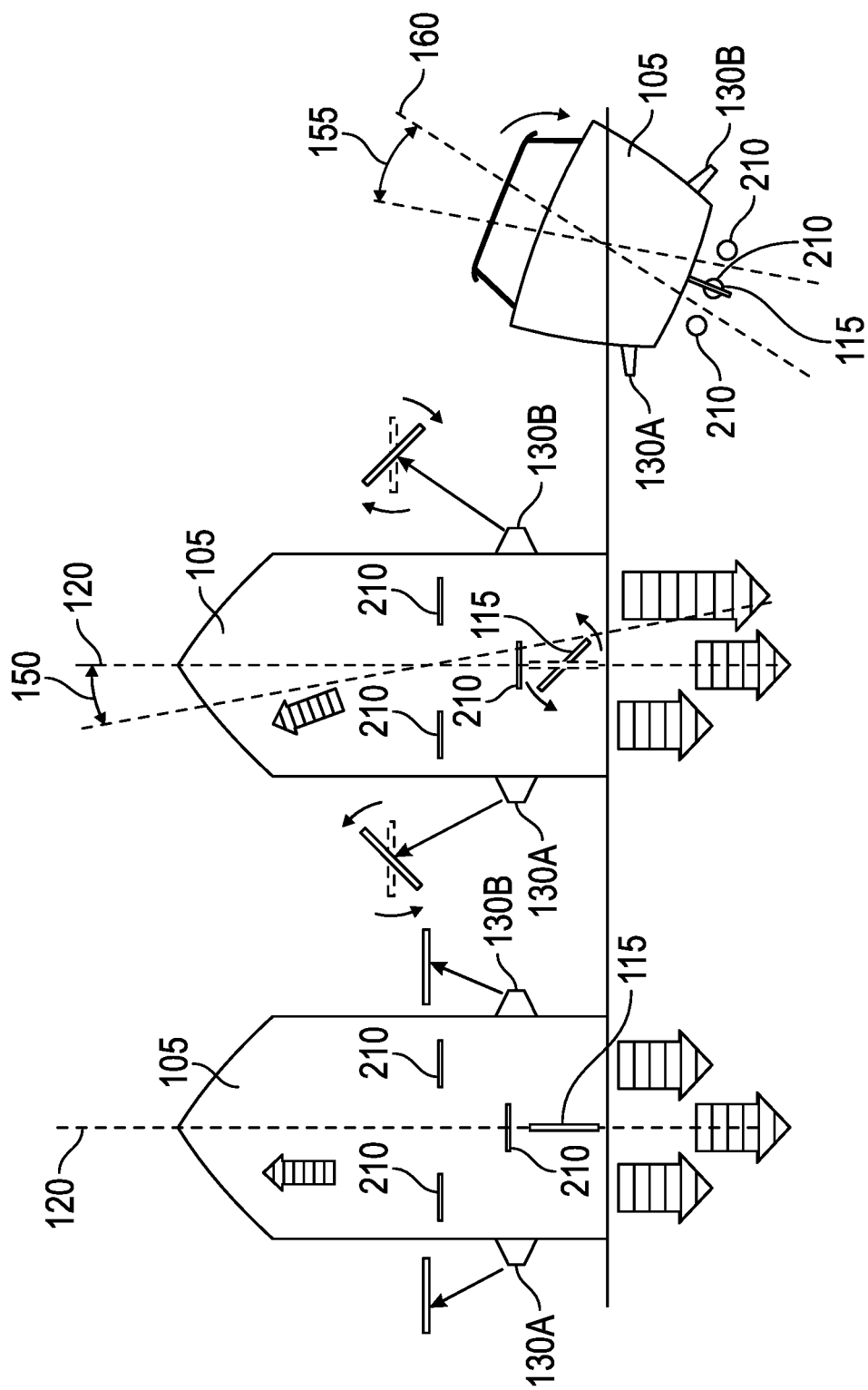
FIG. 12 depicts operation of an exemplary wave generation system control surface and propulsion system configuration.

FIG. 12 depicts operation of an exemplary wave generation system control surface and propulsion system configuration. The exemplary wave generation system control surface and propulsion system configuration depicted by FIG. 12 includes the three propulsion methods each comprising one of the propellers 210. The first and second propulsion method are disposed off-center from the wave generation machine 105 longitudinal axis 120. The third propulsion method is disposed in line with the wave generation machine 105 longitudinal axis 120 and aft of the first and second propulsion method. The depicted configuration also includes the control surface 115 disposed in line with the wave generation machine longitudinal axis 120 and aft of the third propulsion method. The illustrated configuration also includes the two foil control surfaces 130A and 130B disposed at the machine 105 sides forward of the control surface 115, aft of the first and second propulsion methods, and substantially in line, perpendicularly to the wave generation machine longitudinal axis 120, with the third propulsion method. In the depicted example, the propulsion methods and control surfaces are governed by a control system configured in the machine 105. In the illustrated example, the wave generation scenario begins with the machine 105 control system configuring equal thrust by the propulsion methods, straight control surfaces, and level foils, resulting in a straight and level initial trajectory by the wave generation machine 105. In the depicted example scenario, the control system increases thrust on the right propulsion method, rotates the control surface counterclockwise, and rotates the right and/or left foils/control surfaces, to change the yaw slip angle 150 and the roll angle 155, and create a desirable surface for surfing behind the machine 105 on one side. In an illustrative example, the control system may switch the control surface positions and/or thrust power settings from one side to the other, to create a desirable surface for surfing on the opposite side of the machine.

Figure 13:
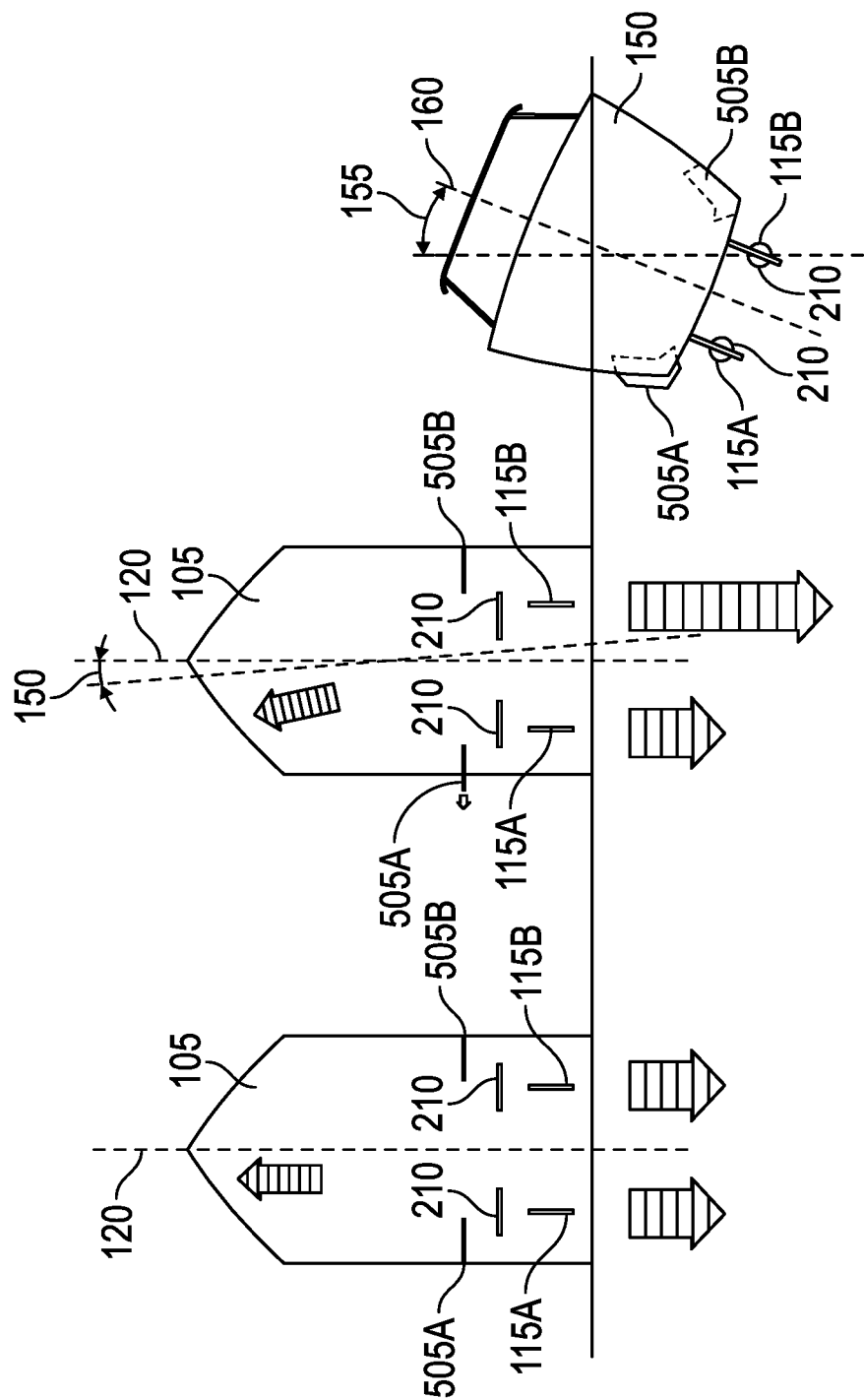
FIG. 13 depicts operation of an exemplary wave generation system control surface and propulsion system configuration.

FIG. 13 depicts operation of an exemplary wave generation system control surface and propulsion system configuration. The exemplary wave generation system control surface and propulsion system configuration depicted by FIG. 13 includes the two propulsion methods each comprising one of the propellers 210 disposed off-center from the wave generation machine 105 longitudinal axis 120. The depicted configuration also includes the control surfaces 115A and 115B disposed off-center from the wave generation machine longitudinal axis 120 and aft of the propulsion methods. The illustrated configuration also includes the retractable tab control surface 505A and the retractable tab control surface 505B, described at least with reference to FIG. 5D. In the illustrated example, the control surfaces 505A and 505B are positioned and mounted to the hull bottom and side, and forward of the propulsion methods. In the depicted example, the propulsion methods and control surfaces are governed by a control system configured in the machine 105. In the illustrated example, the wave generation scenario begins with the machine 105 control system configuring equal thrust by the propulsion methods, straight control surfaces, and retracted tabs, resulting in a straight and level initial trajectory by the wave generation machine 105. In the depicted example scenario, the control system increases thrust on the right propulsion method, and extends the left tab/control surface, to change the yaw slip angle 150 and the roll angle 155, and create a desirable surface for surfing behind the machine 105 on one side. In an illustrative example, the control system may switch the control surface positions and/or thrust power settings, from one side to the other, to create a desirable surface for surfing on the opposite side of the machine.

Figure 14:
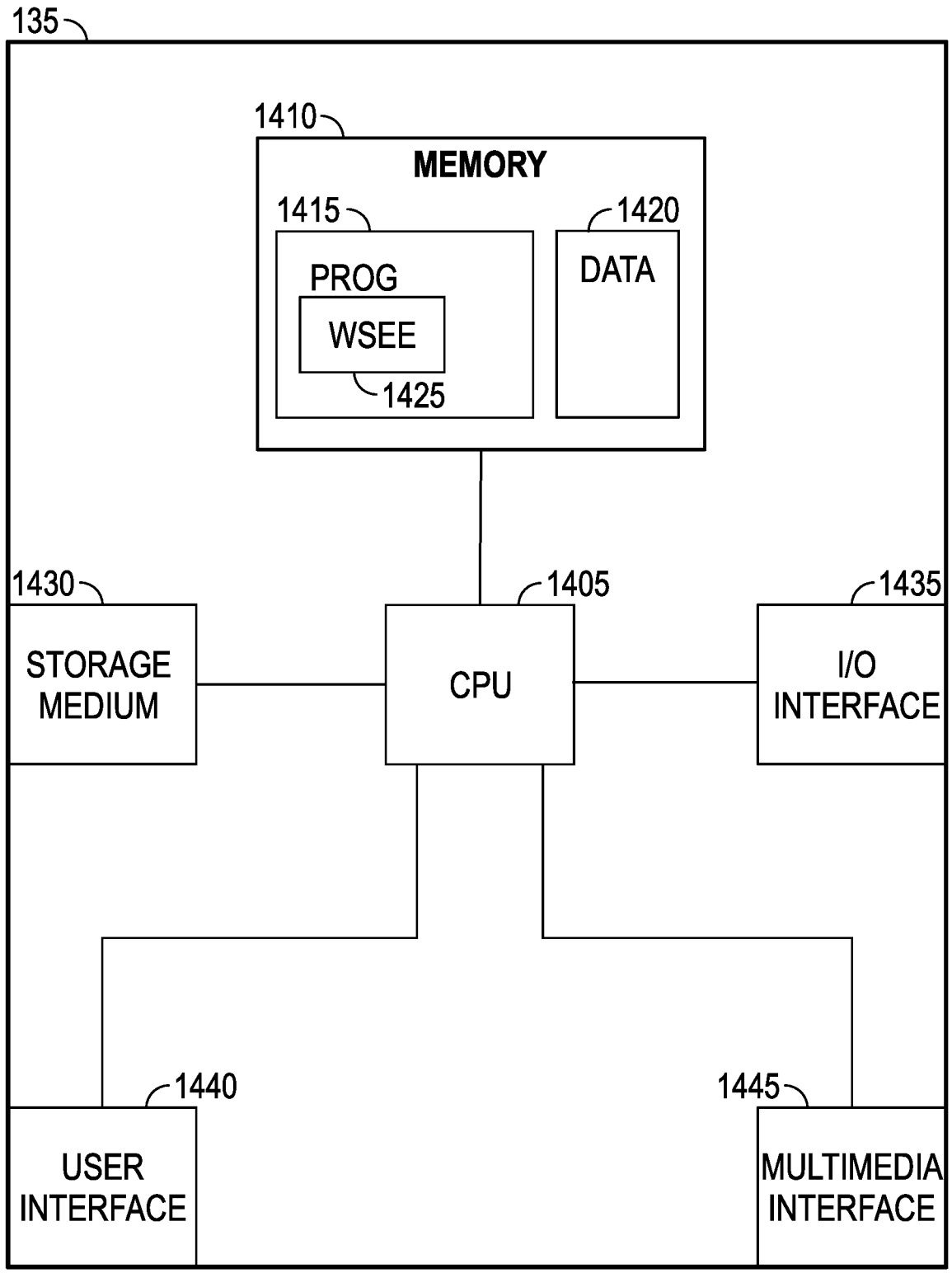
FIG. 14 depicts a structural view of an exemplary computing device configured with a Wake Surf Enhancement Engine (WSEE) designed to generate a wave based on adjusting control surfaces and differential thrust vector propulsion configured in a machine to create different rate flows based on the machine's yaw slip angle as the machine moves in water, and direct the flows to converge and form a wave trailing the machine.

FIG. 14 depicts a structural view of an exemplary computing device configured with a Wake Surf Enhancement Engine (WSEE) designed to generate a wave based on adjusting control surfaces and differential thrust vector propulsion configured in a machine to create different rate flows based on the machine's yaw slip angle as the machine moves in water, and direct the flows to converge and form a wave trailing the machine. In FIG. 14, the block diagram of the exemplary control system 135 (also depicted at least in FIG. 1) includes the processor 1405 and the memory 1410. The processor 1405 is in electrical communication with the memory 1410. The depicted memory 1410 includes the program memory 1415 and the data memory 1420. The depicted program memory 1415 includes processor-executable program instructions implementing the Wake Surf Enhancement Engine (WSEE) 1425. The illustrated program memory 1415 may encode processor-executable program instructions configured to implement an Operating System (OS). The OS may include processor executable program instructions configured to implement various operations when executed by the processor 1405. The OS may be omitted. The illustrated program memory 1415 may encode processor-executable program instructions configured to implement various Application Software. The Application Software may include processor executable program instructions configured to implement various operations when executed by the processor 1405. The Application Software may be omitted. In the depicted implementation, the processor 1405 is communicatively and operably coupled with the storage medium 1430. In the depicted implementation, the processor 1405 is communicatively and operably coupled with the Input/Output (I/O) interface 1435. In the depicted implementation, the I/O interface 1435 includes a network interface. The network interface may be a wireless network interface. The network interface may be a Wi-Fi interface. The network interface may be a Bluetooth® interface. The control system 135 may include more than one network interface. The network interface may be a wireline interface. The network interface may be omitted. The I/O interface 1435 may be configured with circuitry and/or software designed to operably couple one or more sensor with the processor 1405. The one or more sensor operably coupled with the processor 1405 may be configured in the machine 105 (depicted at least in FIG. 1) and disposed in various locations on or in the machine 105. The one or more sensor operably coupled with the processor 1405 may be an accelerometer. The one or more sensor operably coupled with the processor 1405 may include a gyroscopic sensor. The one or more sensor operably coupled with the processor 1405 may include a motion sensor. The one or more sensor operably coupled with the processor 1405 may be a magnetometer. The one or more sensor operably coupled with the processor 1405 may be an inertial measurement unit (IMU). In an illustrative example, one or more IMU may be configured with a combination of different types of sensors, such as, for example, accelerometers, gyroscopes, and magnetometers, designed to measure the specific forces acting on the machine 105 (depicted at least in FIG. 1), angular rate, and orientation of the machine 105. The control system 135 may include a GPS module operably coupled with the processor 1405. The I/O interface 1435 may be configured with circuitry and/or software designed to operably couple one or more control surface or propulsion method with the processor 1405. In an illustrative example, the I/O interface 1435 may include circuitry and/or software configured to permit the processor 1405 to govern the operation, position, angle, and movement of control surfaces and propulsion methods configured in the machine 105. The I/O interface 1435 may include circuitry and/or software designed to permit the processor 1405 to govern machine 105 control surfaces and propulsion methods interfaced with the processor 1405 through electric servo motors, solenoids, actuators, hydraulic pumps, hydraulic cylinders, position encoders, limit switches, and the like, operably coupled with the processor 1405. In the depicted implementation, the processor 1405 is communicatively and operably coupled with the user interface 1440. The user interface 1440 may be adapted to receive input from a user or send output to a user. The user interface 1440 may be adapted to an input-only or output-only user interface mode. The user interface 1440 may include an imaging display. The user interface 1440 may include an audio interface. The audio interface may include an audio input. The audio interface may include an audio output. The user interface 1440 may be touch-sensitive. The user interface 1440 may include a user-operable mobile device configured with processor executable program instructions designed to enable user operation of the control system 135 via the mobile device. The user interface 1440 may include an input sensor array. The input sensor array may include one or more imaging sensor. The input sensor array may include one or more audio transducer. The input sensor array may include a radio-frequency detector. The input sensor array may include an ultrasonic audio transducer. The input sensor array may include image sensing subsystems or modules configurable by the processor 1405 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. The depicted memory 1410 may contain processor executable program instruction modules configurable by the processor 1405 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, image pattern recognition, or anomaly detection. The input sensor array may include audio sensing subsystems or modules configurable by the processor 1405 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. The depicted memory 1410 may contain processor executable program instruction modules configurable by the processor 1405 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In the depicted implementation, the processor 1405 is communicatively and operably coupled with the multimedia interface 1445. In the illustrated implementation, the multimedia interface 1445 includes interfaces adapted to input and output of audio, video, and image data. The multimedia interface 1445 may include one or more still image camera or video camera. The multimedia interface 1445 may include one or more microphone. The multimedia interface 1445 may include a wireless communication means configured to couple the multimedia interface 1445 operably and communicatively with a multimedia data source or sink external to the control system 135. The multimedia interface 1445 may include interfaces adapted to send, receive, or process encoded audio or video. The multimedia interface 1445 may include one or more video, image, or audio encoder. The multimedia interface 1445 may include one or more video, image, or audio decoder. The multimedia interface 1445 may include interfaces adapted to send, receive, or process one or more multimedia stream. The multimedia interface 1445 may include a Graphics Processing Unit (GPU). The multimedia interface 1445 may be omitted. Useful examples of the illustrated control system 135 include, but are not limited to, personal computers, servers, tablet PCs, smartphones, embedded controllers, or other computing devices. Multiple control system 135 devices may be operably linked to form a computer network in a manner as to distribute and share one or more resources, such as clustered computing devices and server banks/farms. Various arrangements of such general-purpose multi-unit computer networks suitable for implementations of the disclosure, their typical configuration, and standardized communication links are well known to one skilled in the art, as explained in more detail at least with reference to FIG. 17. An exemplary control system 135 design may be realized in a distributed implementation. Some control system 135 designs may be partitioned between a client device, such as, for example, a phone, and a more powerful server system via one or more network, as depicted, for example, in FIG. 17. A control system 135 partition hosted on a PC or mobile device may choose to delegate some parts of computation, such as, for example, machine learning or deep learning, to a host server. A client device partition may delegate computation-intensive tasks to a host server to take advantage of a more powerful processor, or to offload excess work. Some control system 135 devices may be configured with a mobile chip including an engine adapted to implement specialized processing, such as, for example, neural networks, machine learning, artificial intelligence, image recognition, audio processing, or digital signal processing. Such an engine adapted to specialized processing may have sufficient processing power to implement some control system 135 features. However, an exemplary control system 135 may be configured to operate on a device with less processing power, such as, for example, various gaming consoles, which may not have sufficient processor power, or a suitable CPU architecture, to adequately support control system 135. Various implementations configured to operate on a such a device with reduced processor power may be configured to work in conjunction with a more powerful server system.

Figure 15:
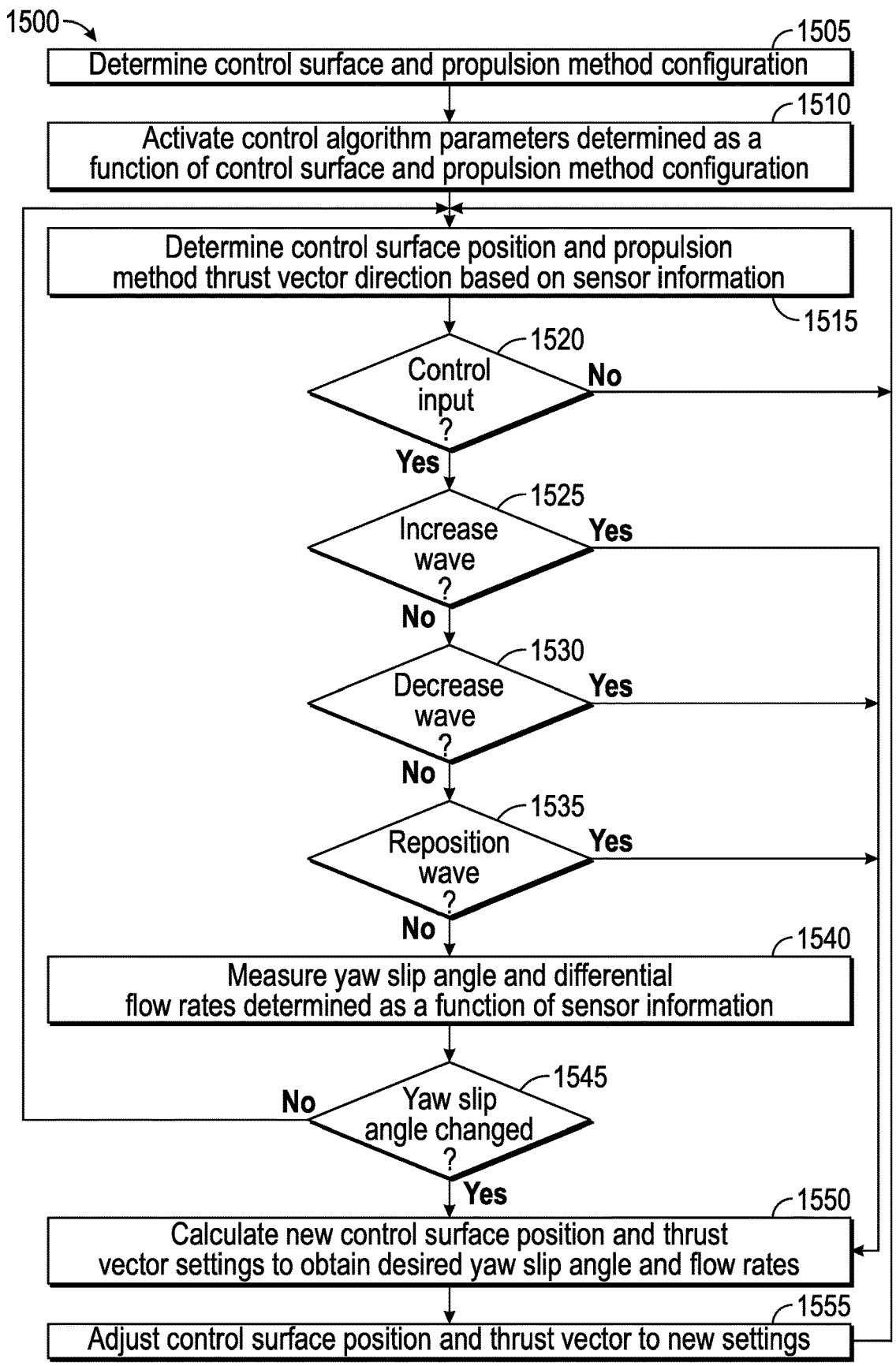
FIG. 15 depicts a process flow of an exemplary Wake Surf Enhancement Engine (WSEE) configured to generate a wave based on adjusting control surfaces and differential thrust vector propulsion configured in a machine to create different rate flows based on the machine's yaw slip angle as the machine moves in water, and direct the flows to converge and form a wave trailing the machine.

FIG. 15 depicts a process flow of an exemplary Wake Surf Enhancement Engine (WSEE) configured to generate a wave based on adjusting control surfaces and differential thrust vector propulsion configured in a machine to create different rate flows based on the machine's yaw slip angle as the machine moves in water, and direct the flows to converge and form a wave trailing the machine. In FIG. 15, the depicted method is given from the perspective of the WSEE 1425 implemented via processor-executable program instructions executing on the control system 135 processor 1405, depicted in FIG. 14. In the illustrated implementation, the WSEE 1425 executes as program instructions on the processor 1405 configured in the WSEE 1425 host control system 135, depicted in at least FIG. 1, FIG. 14, and FIG. 17. In some implementations, the WSEE 1425 may execute as a cloud service communicatively and operatively coupled with system services, hardware resources, or software elements local to and/or external to the WSEE 1425 host control system 135. The depicted method 1500 begins at step 1505 with the processor 1405 determining control surface and propulsion method configuration. The processor 1405 may determine the control surface and propulsion method configuration based on reading data from one or more sensor operably coupled with one or more control surface or propulsion method. In an illustrative example, the control surface and propulsion method configuration determined by the processor 1405 may be a variation of a control surface or propulsion method configuration described with reference to FIGS. 6-13.

Then, the method continues at step 1510 with the processor 1405 activating control algorithm parameters determined as a function of the control surface and propulsion method configuration. For example, the processor 1405 may adapt control algorithm parameters to the control surface and propulsion method configuration determined by the processor 1405 at step 1505.

Then, the method continues at step 1515 with the processor 1405 determining control surface position and propulsion method thrust vector direction based on sensor information. The control surface position and propulsion method thrust vector direction may be determined by the processor 1405 as a function of data from one or more sensor configured to detect and communicate the position of a control surface or propulsion method.

At step 1520, the processor 1405 performs a test to determine if control input has been received. The control input received by the processor 1405 may be received from a user interface. The control input received by the processor 1405 may be received as a result of an interrupt or event generated by a processor executable program instruction module configured to monitor a wave generation parameter, and cause an interrupt or event directing the processor 1405 to adjust wave generation. In an illustrative example, the control input may comprise sensor data determined by the processor 1405 to deviate from an expected value by at least a predetermined threshold outside of which the processor 1405 is configured by processor executable program instructions to adjust wave generation to the expected value. The processor 1405 may adjust wave generation based on, for example, adjusting one or more control surface angle or position, or adjusting the propulsion system differential thrust vector.

Upon a determination by the processor 1405 at step 1520 no control input was received, the method continues at step 1515 with the processor 1405 determining control surface position and propulsion method thrust vector direction based on sensor information. Upon a determination by the processor 1405 at step 1520 control input was received, the method continues at step 1525.

At step 1525, the processor 1405 performs a test to determine if the control input comprises an indication to increase the wave. Upon a determination by the processor 1405 at step 1525 the control input does not comprise an indication to increase the wave, the method continues at step 1530. Upon a determination by the processor 1405 at step 1525 the control input comprises an indication to increase the wave, the method continues at step 1550.

At step 1530, the processor 1405 performs a test to determine if the control input comprises an indication to decrease the wave. Upon a determination by the processor 1405 at step 1530 the control input does not comprise an indication to decrease the wave, the method continues at step 1535. Upon a determination by the processor 1405 at step 1530 the control input comprises an indication to decrease the wave, the method continues at step 1550.

At step 1535, the processor 1405 performs a test to determine if the control input comprises an indication to reposition the wave. Upon a determination by the processor 1405 at step 1535 the control input does not comprise an indication to reposition the wave, the method continues at step 1540. Upon a determination by the processor 1405 at step 1535 the control input comprises an indication to reposition the wave, the method continues at step 1550.

At step 1540, the processor 1405 measures the machine yaw slip angle and differential flow rates determined as a function of sensor information, and the method continues at step 1545.

At step 1545, the processor 1405 performs a test to determine if the machine yaw slip angle changed, based on comparing the yaw slip angle measured by the processor 1405 at step 1540 with a historical yaw slip angle measured by the processor 1405. Upon a determination by the processor 1405 at step 1545 the yaw slip angle did not change, the method continues at step 1515 with the processor 1405 determining control surface position and propulsion method thrust vector direction based on sensor information. Upon a determination by the processor 1405 at step 1545 the yaw slip angle changed, the method continues at step 1550.

At step 1550, the processor 1405 calculates new control surface position and thrust vector settings to obtain the desired yaw slip angle and flow rates, determined by the processor 1405 as a function of the control input, sensor information, control surface position, and propulsion system differential thrust vector, and the method continues at step 1555.

At step 1555, the processor 1405 adjusts the control surface positions and the propulsion system differential thrust vector to the new settings calculated by the processor 1405 at step 1550.

In some implementations, the method may repeat. In various implementations, the method may end.

Figure 16:
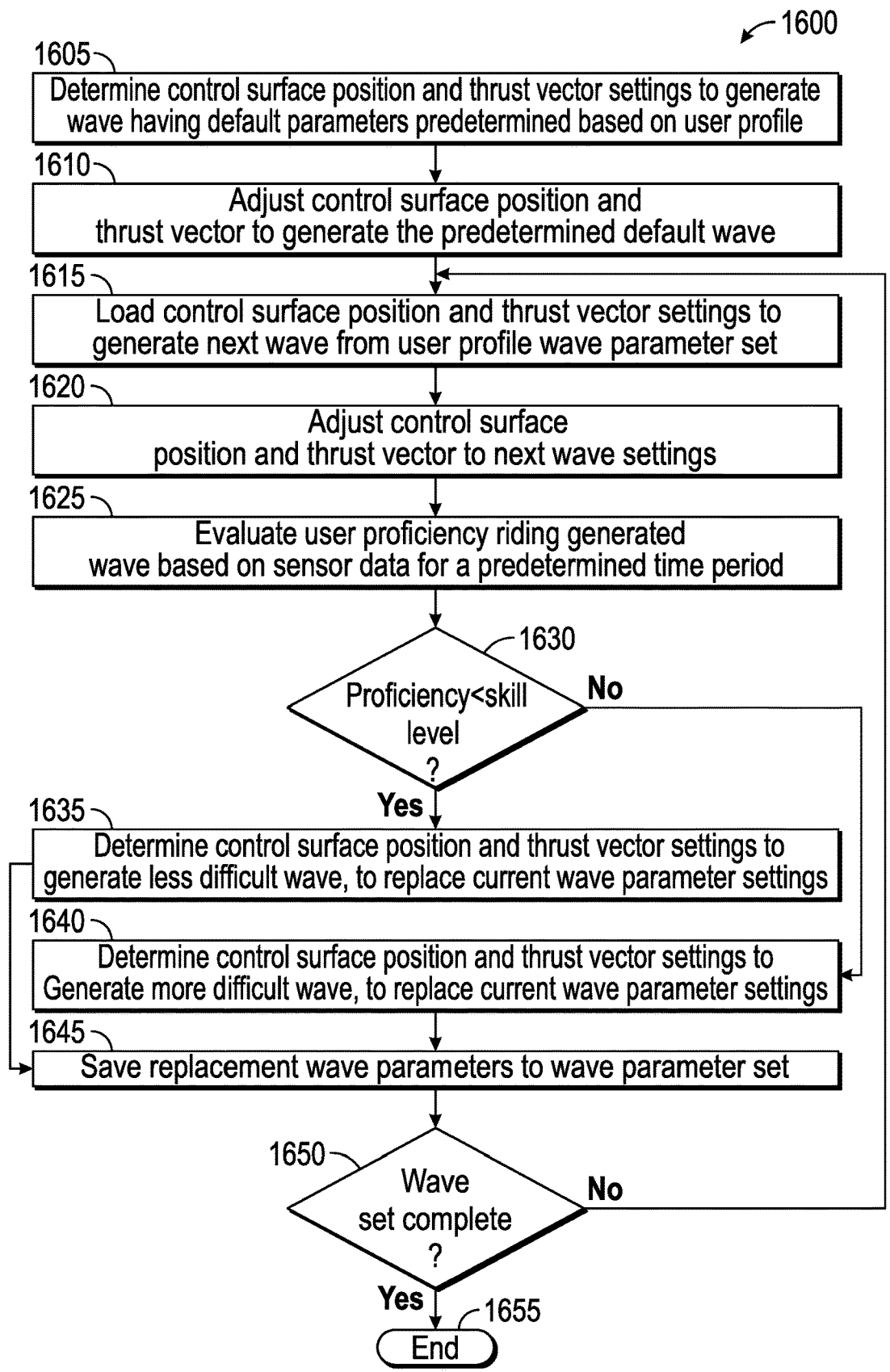
FIG. 16 depicts a process flow of an exemplary Wake Surf Enhancement Engine (WSEE) configured to generate waves in a challenge scenario, based on adjusting control surfaces and differential thrust vector propulsion to create waves at various difficulty levels in a predetermined pattern for a predetermined time period.

FIG. 16 depicts a process flow of an exemplary Wake Surf Enhancement Engine (WSEE) configured to generate waves in a challenge scenario, based on adjusting control surfaces and differential thrust vector propulsion to create waves at various difficulty levels in a predetermined pattern for a predetermined time period. In FIG. 16, the depicted method is given from the perspective of the WSEE 1425 implemented via processor-executable program instructions executing on the control system 135 processor 1405, depicted in FIG. 14. In the illustrated implementation, the WSEE 1425 executes as program instructions on the processor 1405 configured in the WSEE 1425 host control system 135, depicted in at least FIG. 1, FIG. 14, and FIG. 17. In some implementations, the WSEE 1425 may execute as a cloud service communicatively and operatively coupled with system services, hardware resources, or software elements local to and/or external to the WSEE 1425 host control system 135. The depicted method 1600 begins at step 1605 with the processor 1405 determining control surface positions and differential thrust vector settings to generate a wave having default parameters predetermined based on a user's profile. The user's profile may include default wave generation parameters defining a set of waves at a difficulty level related to the user's proficiency and past performance, and a predetermined time period for each wave.

Then, the method continues at step 1610 with the processor 1405 adjusting control surface position and propulsion system differentia thrust vector settings to generate the predetermined initial default wave based on the user profile.

Then, the method continues at step 1615 with the processor 1405 loading the control surface position and thrust vector settings to generate the next wave from user profile wave parameter set.

Then, the method continues at step 1620 with the processor 1405 adjusting the control surface position and propulsion system differential thrust vector to the next wave settings, to generate the next wave.

Then, the method continues at step 1625 with the processor 1405 evaluating user proficiency riding the generated wave, based on sensor data evaluated by the processor 1405 for a predetermined time period. The processor 1405 may evaluate user proficiency based on image recognition by the processor 1405 determined as a function of rider images captured by a camera operably coupled with the processor 1405.

At step 1630, the processor 1405 performs a test to determine if the rider's proficiency riding the generated wave is less than the user skill level maintained in the user's profile, based on the user proficiency evaluation performed by the processor 1405 at step 1625. Upon a determination by the processor 1405 at step 1630 the rider's proficiency was less than the user skill level, the method continues at step 1635. Upon a determination by the processor 1405 at step 1630 the rider's proficiency was not less than the user skill level, the method continues at step 1640.

At step 1635, the processor 1405 determines control surface position and propulsion system differential thrust vector settings to generate a less difficult wave, to replace the current wave parameter settings. The processor 1405 may update the user's profile with the user's proficiency determined by the processor 1405 at step 1625. Then, the method continues at step 1645.

At step 1640, the processor 1405 determines control surface position and propulsion system differential thrust vector settings to generate a more difficult wave, to replace the current wave parameter settings. The processor 1405 may update the user's profile with the user's proficiency determined by the processor 1405 at step 1625. Then, the method continues at step 1645.

At step 1645, the processor 1405 saves the replacement wave parameters determined by the processor 1405 at step 1635 or 1640 to the wave parameter set in the user's profile. Then, the method continues at step 1650.

At step 1650, the processor 1405 performs a test to determine if the complete user profile wave parameter set has been generated. Upon a determination by the processor 1405 at step 1650 the wave set is not complete, the method continues at step 1615 with the processor 1405 loading the control surface position and thrust vector settings to generate the next wave from user profile wave parameter set. Upon a determination by the processor 1405 at step 1650 the wave set is complete, the method ends at step 1655.

In some implementations, the method may repeat.

Figure 17:
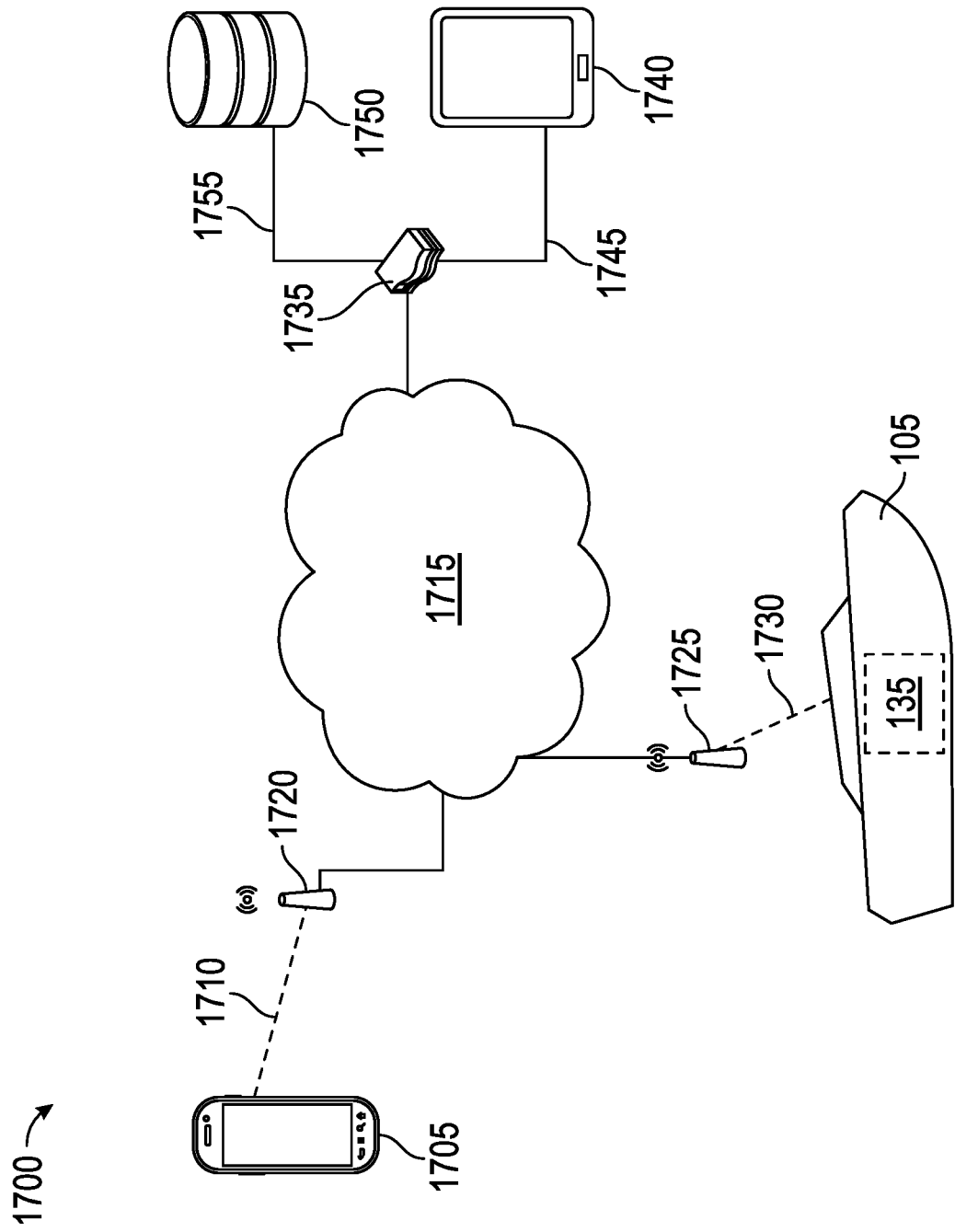
FIG. 17 depicts a schematic view of an exemplary wave generation network configured to generate waves based on adjusting control surfaces and differential thrust vector propulsion configured in a machine to create different rate flows based on the machine's yaw slip angle as the machine moves in water, and direct the flows to converge and form a wave trailing the machine.

FIG. 17 depicts a schematic view of an exemplary wave generation network configured to generate waves based on adjusting control surfaces and differential thrust vector propulsion configured in a machine to create different rate flows based on the machine's yaw slip angle as the machine moves in water, and direct the flows to converge and form a wave trailing the machine. In the exemplary wave generation implementation depicted by FIG. 17, data may be transferred to the wave generation system, stored by the wave generation system and/or transferred by the wave generation system to users of the wave generation system across local area networks (LANs) or wide area networks (WANs). In various implementations in accordance with the present disclosure, the wave generation system may include numerous servers, data mining hardware, computing devices, or any combination thereof, communicatively connected across one or more LAN and/or WAN. One of ordinary skill in the art would appreciate that there are numerous manners in which the wave generation system could be configured, and implementations of the present disclosure are contemplated for use with any operable configuration. Referring to FIG. 17, a schematic overview of a wave generation system implementation in accordance with the present disclosure is illustrated. In the depicted implementation, the exemplary wave generation system includes the exemplary wave generation machine 105 configured with the control system 135 (also depicted at least in FIG. 1 and FIG. 14) designed to generate waves based on adjusting control surfaces and differential thrust vector propulsion configured in the wave generation machine 105 to create different rate flows based on the machine 105 yaw slip angle as the machine 105 moves in water, and direct the flows to converge and form a wave trailing the machine 105. In the illustrated implementation, the mobile device 1705 is a smart phone computing device configured with a mobile device application designed to facilitate user operation and management of the wave generation machine 105. The mobile device 1705 may be located remote from the wave generation machine 105. The mobile device 1705 may be co-located on, in, or at the same location as, the wave generation machine 105. In the depicted implementation, the mobile device 1740 is a tablet computing device configured to manage wave generation machine 105 operational data retrievably stored in the database server 1750. In the depicted implementation, the database server 1750 stores user profile data, wave parameter settings, reference images and image recognition algorithms, and video/images of wave generation machine 105 users, for retrievable access and update by the control system 135 configured in the wave generation machine 105. In the illustrated implementation, the mobile device 1705 is communicatively and operably coupled by the wireless link 1710 and the wireless access point 1720 with the network cloud 1715 (for example, the Internet) to send, retrieve, or manipulate information in storage devices, servers, and network components, and exchange information with various other systems and devices via the network cloud 1715. In the depicted implementation, the illustrative wave generation system includes the router 1735 configured to couple the mobile device communicatively and operably 1740 to the network cloud 1715 via the communication link 1745. In the illustrated example, the router 1735 also communicatively and operably couples the database server 1750 to the network cloud 1715 via the communication link 1755. In various implementations, one or more of: the wave generation machine 105, the mobile device 1705, the mobile device 1740, or the database server 1750 may include an application server configured to store or provide access to information used by the wave generation system. In some implementations, one or more application server may retrieve or manipulate information in storage devices and exchange information through the network cloud 1715. In various implementations, one or more of: the wave generation machine 105, the mobile device 1705, the mobile device 1740, or the database server 1750 may include various applications implemented as processor-executable program instructions. Various processor-executable program instruction applications may also be configured in some implementations, to manipulate information stored remotely and process and analyze data stored remotely across the network cloud 1715 (for example, the Internet). According to an exemplary implementation, as shown in FIG. 17, exchange of information through the network cloud 1715 or other network may occur through one or more high speed connections. In some cases, high speed connections may be over-the-air (OTA), passed through networked systems, directly connected to one or more network cloud 1715 or directed through one or more router. In various implementations, one or more routers may be optional, and other implementations in accordance with the present disclosure may or may not utilize one or more router. One of ordinary skill in the art would appreciate that there are numerous ways any or all of the depicted devices may connect with the network cloud 1715 for the exchange of information, and implementations of the present disclosure are contemplated for use with any method for connecting to networks for the purpose of exchanging information. Further, while this application may refer to high speed connections, implementations of the present disclosure may be utilized with connections of any useful speed. In an implementation example, components or modules of the system may connect to one or more of: the wave generation machine 105, the mobile device 1705, the mobile device 1740, or the database server 1750 via the network cloud 1715 or other network in numerous ways. For instance, a component or module may connect to the system i) through a computing device directly connected to the network cloud 1715, ii) through a computing device connected to the network cloud 1715 through a routing device, or iii) through a computing device connected to a wireless access point. One of ordinary skill in the art will appreciate that there are numerous ways that a component or module may connect to a device via network cloud 1715 or other network, and implementations of the present disclosure are contemplated for use with any network connection method. In various examples, one or more of: the wave generation machine 105, the mobile device 1705, the mobile device 1740, or the database server 1750 may include a personal computing device, such as a smartphone, tablet computer, wearable computing device, cloud-based computing device, virtual computing device, or desktop computing device, configured to operate as a host for other computing devices to connect to. One or more communications means of the system may be any circuitry or other means for communicating data over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with implementations of the present disclosure, and implementations of the present disclosure are contemplated for use with any communications means.

Figure 18A:
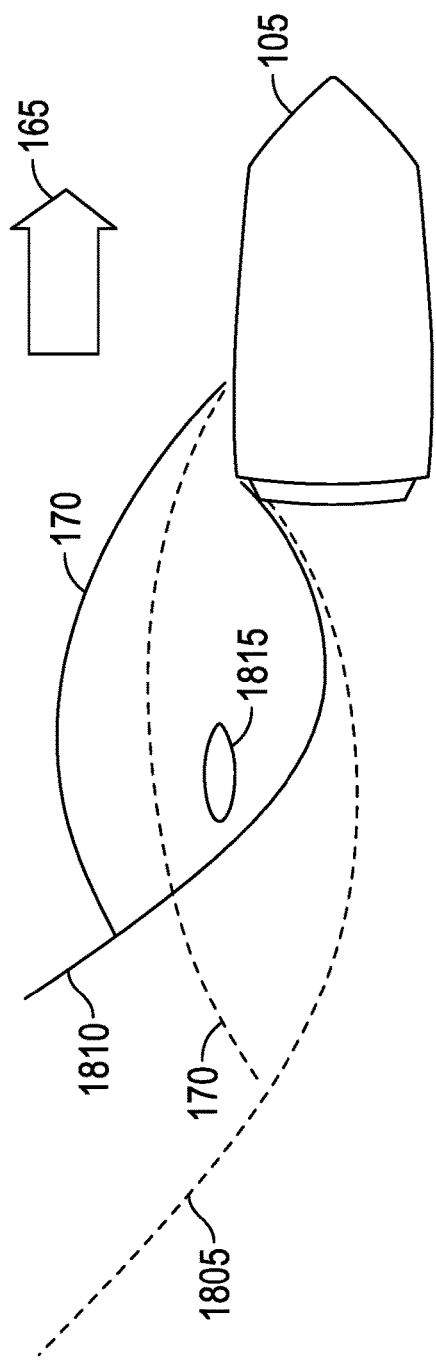
FIGS. 18A-18C depict operation of exemplary pre-programmed and timed wave manipulation features.
Figure 18B:
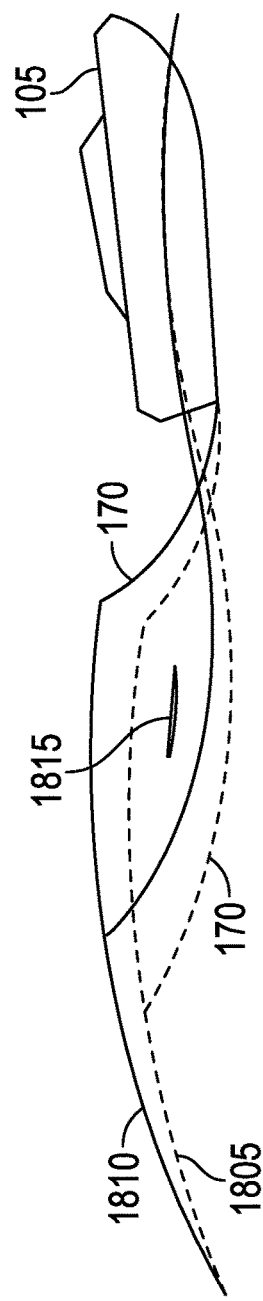
Figure 18C:
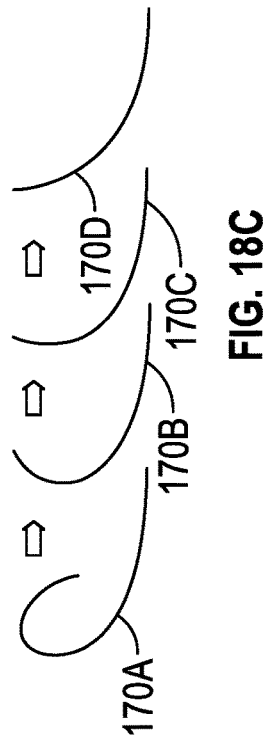

FIGS. 18A-18C depict operation of exemplary pre-programmed and timed wave manipulation features. In FIG. 18A, the exemplary wave generation system is configured to create the wave 170 with variable dimensions and shapes according to user preference, between at least the wave lower range 1805 and the wave upper range 1810, based on adjusting control surfaces and differential thrust vector propulsion configured in the machine to create different rate flows based on the machine's yaw slip angle as the machine moves in water, and directing the flows to converge and form a wave trailing the machine. The depicted wave vortex 1815 position in the generated wave 170 is adjustable as a function of adjustably directing the flows to converge at various locations forming the wave 170. FIG. 18B depicts the variable vertical generated wave 170 dimensions, from the wave lower range 1805 to the wave upper range 1810. FIG. 18C illustrates an exemplary pre-programmed challenge scenario comprising the set of waves generated with different wave shapes 170A,B,C,D. In the depicted example, the wave generation control system adjusts the wave generation machine's control surface positions and propulsion system's differential thrust vector according to a wave parameter set based on a rider's profile. In an exemplary scenario, the wave generation system may generate wave 170A for two minutes, generate wave 170B for one minute, generate wave 170C for 2 minutes, and generate wave 170D for five minutes. Activating the pre-programed challenge initiates the system to automatically change the thrust and control surfaces to manipulate the wave shape in the water and create a dynamic surface for surfing that is actively changing. The craft's system will increase the speed through the water to reduce the size of the wave, thereby increasing the level of difficulty and skill required to ride the wave. An exemplary wave generation system may change throttle settings and control surface angles to reduce the width of the rideable surface, thus increasing the level of difficulty and skill needed to ride the wave.

Although various features have been described with reference to the Figures, other features are possible. For example, some wave generation implementations may be configured to create a pre-programmed game, such as a pre-programmed timed wave game, to gamify the wave generation. An exemplary pre-programmed timed wave game may manipulate the wave height and the wave length and create challenges for the rider, gamifying the wave riding session created by the system for the rider. Various implementations may include User Profile records having a customizable Wave Set storing Wave Generation Parameters that may include control algorithm parameters selected to generate a wave having predetermined characteristics. For example, a rider may be challenged by the system's automatic manipulation of the wave, and create a long wave, or a short wave, a narrow wave, and so on, automatically. And the rider is challenged to surf that wave sequence. For example, the system may create a challenge, and a gamification, for one rider or a group of riders, providing a more inclusive surfing experience for everyone, and creating a challenge for individuals.

Some implementation examples may generate waves having difficulty levels in a Progressive sequence. For example, the system may manipulate wave parameters, changing the wave characteristics over time on a time scale, for example, over a 10 minute time frame. In an exemplary time frame, the system may cycle through different wave configurations automatically, as the rider is riding. In an illustrative example, a rider may be challenged through various changes of the wave parameters, and they can then ride that wave and be challenged by that timed type of protocol. For example, the system may be configured with an advanced program to put a rider through, starting with a small wave that gets really, really big, and then goes really, really, small quickly, or the swell is really, really, big, and goes really, really, small quickly. An exemplary implementation may actively manipulate the wave shape over a time scale to challenge the Surfers.

Various example implementations may employ inputs from sensors to control the system, such as, for example, motion sensors, gyroscopes, and accelerometers, to be able to sense the yaw slip angle, the roll, and the pitch, and GPS, tracking location. Some implementations may incorporate image recognition algorithms to provide feedback on the rider's position or angle in the wave, and also analyze the shape of the wave to give input to the control algorithms on what to do. For example, capturing rider position, stance, and performance to facilitate evaluating a rider's proficiency riding a wave with predetermined parameters, will enable providing feedback to the rider concerning their performance and how to improve. In an illustrative example, the image recognition software may be configured to take photos when appropriate, match various features of the rider's stance and position riding the wave with model photographs from a feature repository, and provide feedback to the rider on their stance, and their position, and give some training input to the rider. For example, a wave generation implementation may analyze a rider's body positions based on image recognition using trained machine learning models to match photos captured of the rider's body positions riding predetermined waves with photos of expert riders and photos of riders making mistakes. Some examples may determine scores for riders based on analyzing the rider's body positions using image recognition. For example, a rider performance evaluation system in accordance with the present disclosure may determine where the rider's hips are, how the legs are positioned, or where they are pointed, providing a coaching system. Various example systems may use image recognition as control input to control the wave generation by the control system. For example, the control algorithm may be configured to monitor the height or shape of the generated wave, based on photos processed live by an image recognition algorithm that indicates to the control algorithm when and how the wave has changed from what was desired, causing the control algorithm to change control surface angle or propulsion method thrust vector to correct the wave shape.

In an illustrative example, various wave generation implementations in accordance with the present disclosure may create a foil on one side of the boat, which is similar to an airfoil in the water, known as a hydrofoil. In an illustrative example, the side of the boat may be considered as similar to an airplane wing. As the yaw slip angle changes, the whole side of the boat acts like a foil or airplane wing and creates a low-pressure kind of foil on the side of the boat that is angled towards the water. At the bottom, there is a low pressure, the opposite side of the wave. On the side that the wave is being created, and the side that is angled into the wave, the side of the boat is accelerating the flow, and the flow is being redirected because of that angle, at a higher flow rate towards the center of the boat, aft of the bow but towards the center. After the boat, the water is being redirected at a higher rate than the other side, which is the high pressure side, because of that, the water has more energy, more of a flow rate, and is able to create a cleaner surface and smoother surface, when it converges with the high pressure side on the opposite side of the boat. The control surfaces and the differential thrust and thrust Vectoring are manipulating the craft to result in a foil. A high pressure difference from the right side of the boat to the left side of the craft results in a lip or smooth surface on that low pressure side, which is the angle for the side of the boat. In an illustrative example, the side of the craft would be angled into the water as the craft slips through the water.

In an illustrative example, as used herein, a foil is an additional control surface. That is, a foil is not just a flat surface on the sides. A foil, as used herein, is a foil like an airplane wing, so the term 'foil' is used in reference to control surfaces.

For example, a wave generation implementation in accordance with the present disclosure may include a watercraft configured with a computer, battery management system, interface/display, helm station, batteries, motors, propellers, hydraulic pumps, hydraulic cylinders, 360-degree control surfaces, heading, and speed control sensors. In various examples, the propulsion system thrust directed aft of the watercraft moves the watercraft in the water to generate the enhanced wave based on the computer manipulating the control surfaces and propulsion system to change the watercraft's yaw slip angle as the craft moves forward, enabling the depicted craft to modify, improve and optimize the water flow trailing the craft for surfing.

In an exemplary wave generation implementation in accordance with the present disclosure, the computer configured in the wave generation system may actively engage the propulsion system's differential thrust and manipulates the control surfaces and/or pods to change the yaw slip angle as the surf system moves forward, to change the water trailing one side of the watercraft and create desirable wave characteristics for surfing. In some example implementations, 360-degree control surfaces or thruster pods may be configured aft of the watercraft and forward of the transom. In an illustrative example, the wave generation system may include computer hardware and software, an interface, two electric motors, 360-degree control surfaces and/or pods, a battery management system, and heading and speed control sensor. The computer may be configured to actively modulate and/or set the hardware to maintain a desirable wave based on engaging differential thrust between at least two motors, and manipulate the control surfaces and/or pods to change the machine's yaw slip angle as the craft moves forward. These adjusted configurations change the water trailing one side of the machine to create an enhanced wave with desirable characteristics for surfing.

An exemplary wave generation implementation may be a surf system. The surf system may have a propulsion apparatus and/or control surface that rotates 360 degrees. The propulsion apparatus may include two propulsion methods off center of the longitudinal axis. The propulsion methods may include propellers. The propellers may be configured with propeller shafts. Control surfaces may be mounted to the running surfaces. The surf system may be configured with two propeller shafts and control surfaces that are two separate components, permitting the propellers and control surfaces to be adjusted independently. An exemplary surf system may be configured with propulsion methods and control surfaces designed to be independently controlled by software and/or control circuitry, to adjust the craft's angle traveling through water and optimize the water flow trailing the craft for surfing. The control circuitry and software modulates and sets the propulsion methods' differential thrust vector to change the craft's yaw slip angle. In an illustrative example, an exemplary surf system optimizes the shape of the water flowing behind the stern of the craft, based on adjusting the ship's movement through the water to create and optimize the water trailing the ship for surfing.

In an illustrative example, wake surfing is a water sport in which a rider trails behind a watercraft, riding the watercraft's wake without being directly pulled by the watercraft. Various surf systems provide a propulsion system that integrates into a machine and maneuvers it to manipulate the water trailing craft as it moves through the water. The system adjusts the motor's rpms and control surfaces to change how it moves through the water to produce a desirable wave shape for surfing.

A conventional dual engine craft may have limited maneuverability when creating a desirable wave for surfing, and the wave it creates may be less than optimal. Traditional surf systems may use one propulsion method and three adjustable elements to create desirable surfing conditions. Such traditional systems require additional elements on the hull that fail and add cost, in contrast with implementations according to the present disclosure, which may enable users to have complete maneuverability, optimize the water trailing the craft for surfing, and do not require additional elements integrated or mounted to the transom of the watercraft. Various surf system implementations according to the present disclosure may be referred to as GIGAWAVE.

In an illustrative example, an exemplary GIGAWAVE surf system may use twin electric motors or pod thrusters to perform its function, with control surfaces/elements that enable the craft to modify its movement through the water to create a desirable wave for surfing. An exemplary surf system may be configured with one motor/engine on centerline and control surfaces and/or elements mounted to the transom of the craft.

The surf system may have a propulsion apparatus and/or control surface that rotate 360 degrees. The propulsion apparatus may include two propulsion methods off center of the longitudinal axis. The propulsion methods may include two propellers. The propellers may be configured with propeller shafts. The surf system may be configured with two propeller shafts and control surfaces that are two separate components, permitting the propellers and control surfaces to be adjusted independently, in contrast with some legacy designs that included a propulsion unit that combines the propeller and control surface into one unit. An exemplary GIGAWAVE propulsion method and control surfaces are independently controlled by software to adjust the crafts angle traveling through water to optimize the water flow trailing the craft for surfing. In an illustrative example, an exemplary GIGAWAVE surf system optimizes the shape of the water flowing behind the stern of the craft, in contrast with some legacy designs that may not adjust the ship's movement through the water to create and optimize the water trailing the ship for surfing.

Various surf system designs may provide improved wave generation based on dual motors, control surfaces/rudders and/or pods and software, advantageously using fewer components that may break or require maintenance. Some designs employ electric motors capable to provide instant torque, with precise control.

As one of ordinary skill in the art would recognize, various modifications may be made within the scope of the present disclosure. For example, the thrusting method may be modified from a propeller and control surfaces to thruster pods. The size, shape, material, mounting position, and range of motion of the control surfaces may be modified. The size, shape, material, and mounting position of the motors may be modified. The propeller and control surfaces could be combined into a thruster pod. Additional control surfaces, electric motors, or batteries could be incorporated into the design. In an illustrative example, a surf system according to the present disclosure may be used to maneuver and control the craft/machine in traditional ways.

In the Summary above and in this Detailed Description, and the Claims below, and in the accompanying drawings, reference is made to particular features of various implementations. It is to be understood that the disclosure of particular features of various implementations in this specification is to be interpreted to include all possible combinations of such particular features. For example, where a particular feature is disclosed in the context of a particular aspect or implementation, or a particular claim, that feature can also be used—to the extent possible—in combination with and/or in the context of other particular aspects and implementations, and in an implementation generally.

While multiple implementations are disclosed, still other implementations will become apparent to those skilled in the art from this detailed description. Disclosed implementations may be capable of myriad modifications in various obvious aspects, all without departing from the spirit and scope of the disclosed implementations. Accordingly, the drawings and descriptions are to be regarded as illustrative in nature and not restrictive.

It should be noted that the features illustrated in the drawings are not necessarily drawn to scale, and features of one implementation may be employed with other implementations as the skilled artisan would recognize, even if not explicitly stated herein. Descriptions of well-known components and processing techniques may be omitted so as to not unnecessarily obscure the implementation features.

In the present disclosure, various features may be described as being optional, for example, through the use of the verb "may;" or, through the use of any of the phrases: "in some implementations," "in some designs," "in various implementations," "in various designs," "in an illustrative example," or, "for example." For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be implemented in seven different ways, namely with just one of the three possible features, with any two of the three possible features or with all three of the three possible features.

In various implementations, elements described herein as coupled or connected may have an effectual relationship realizable by a direct connection or indirectly with one or more other intervening elements.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various implementations have been disclosed and described in detail herein, it will be apparent to those skilled in the art that various changes may be made to the disclosed configuration, operation, and form without departing from the spirit and scope thereof. In particular, it is noted that the respective implementation features, even those disclosed solely in combination with other implementation features, may be combined in any configuration excepting those readily apparent to the person skilled in the art as nonsensical. Likewise, use of the singular and plural is solely for the sake of illustration and is not to be interpreted as limiting.

The Abstract is provided to comply with 37 C. F. R. § 1.72(b), to allow the reader to quickly ascertain the nature of the technical disclosure and is submitted with the understanding that it will not be used to interpret or limit the scope or meaning of the claims.

In the present disclosure, all descriptions where "comprising" is used may have as alternatives "consisting essentially of," or "consisting of" In the present disclosure, any method or apparatus implementation may be devoid of one or more process steps or components. In the present disclosure, implementations employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an implementation "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)–(a second number)," this means a range whose limit is the second number. For example, 25 to 100 mm means a range whose lower limit is 25 mm and upper limit is 100 mm.

Many suitable methods and corresponding materials to make each of the individual parts of implementation apparatus are known in the art. One or more implementation part may be formed by machining, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as may be described hereinabove may be used. Many suitable materials are known and available and can be selected and mixed depending on desired strength and flexibility, preferred manufacturing method and particular use, as will be apparent to a person of ordinary skill in the art.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f). Elements recited in means-plus-function format are intended to be construed in accordance with 35 U.S.C. § 112 (f).

Recitation in a claim of the term "first" with respect to a feature or element does not necessarily imply the existence of a second or additional such feature or element.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The terms "abutting" or "in mechanical union" refer to items that are in direct physical contact with each other, although the items may not necessarily be attached together.

The word "exemplary" is used herein to mean "serving as an example, instance, or illustration." Any implementation described herein as "exemplary" is not necessarily to be construed as preferred over other implementations. While various aspects of the disclosure are presented with reference to drawings, the drawings are not necessarily drawn to scale unless specifically indicated.

Reference throughout this specification to "an implementation" or "the implementation" means that a particular feature, structure, or characteristic described in connection with that implementation is included in at least one implementation. Thus, the quoted phrases, or variations thereof, as recited throughout this specification are not necessarily all referring to the same implementation.

Similarly, it should be appreciated that in the above description, various features are sometimes grouped together in a single implementation, Figure, or description thereof for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects may lie in a combination of fewer than all features of any single foregoing disclosed implementation. Thus, the claims following this Detailed Description are hereby expressly incorporated into this Detailed Description, with each claim standing on its own as a separate implementation. This disclosure is intended to be interpreted as including all permutations of the independent claims with their dependent claims.

A system or method implementation in accordance with the present disclosure may be accomplished through the use of one or more computing devices, at least as depicted, for example, in FIG. 14 and FIG. 17. One of ordinary skill in the art would appreciate that an exemplary system appropriate for use with implementation in accordance with the present application may generally include one or more of a Central processing Unit (CPU), Random Access Memory (RAM), a storage medium (e.g., hard disk drive, solid state drive, flash memory, cloud storage), an operating system (OS), one or more application software, a display element, one or more communications means, or one or more input/output devices/means. Examples of computing devices usable with implementations of the present disclosure include, but are not limited to, proprietary computing devices, personal computers, mobile computing devices, tablet PCs, mini-PCs, servers, or any combination thereof. The term computing device may also describe two or more computing devices communicatively linked in a manner as to distribute and share one or more resources, such as clustered computing devices and server banks/farms. One of ordinary skill in the art would understand that any number of computing devices could be used, and implementation of the present disclosure are contemplated for use with any computing device.

In various implementations, communications means, data store(s), processor(s), or memory may interact with other components on the computing device, in order to effect the provisioning and display of various functionalities associated with the system and method detailed herein. One of ordinary skill in the art would appreciate that there are numerous configurations that could be utilized with implementations of the present disclosure, and implementations of the present disclosure are contemplated for use with any appropriate configuration.

According to an implementation of the present disclosure, the communications means of the system may be, for instance, any means for communicating data over one or more networks or to one or more peripheral devices attached to the system. Appropriate communications means may include, but are not limited to, circuitry and control systems for providing wireless connections, wired connections, cellular connections, data port connections, Bluetooth® connections, or any combination thereof. One of ordinary skill in the art would appreciate that there are numerous communications means that may be utilized with implementations of the present disclosure, and implementations of the present disclosure are contemplated for use with any communications means.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description may set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an implementation may include an alternate order of the steps adapted to a particular application of a technique disclosed herein. All such variations and modifications are intended to fall within the scope of this disclosure. The depiction and description of steps in any particular order is not intended to exclude implementations having the steps in a different order, unless required by a particular application, explicitly stated, or otherwise clear from the context.

Traditionally, a computer program consists of a sequence of computational instructions or program instructions. It will be appreciated that a programmable apparatus (that is, computing device) can receive such a computer program and, by processing the computational instructions thereof, produce a further technical effect.

A programmable apparatus may include one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable, and replaceable, or fixed. It will also be understood that a computer can include a Basic Input/Output System (BIOS), firmware, an operating system, a database, or the like that can include, interface with, or support the software and hardware described herein.

Implementations of the system as described herein are not limited to applications involving conventional computer programs or programmable apparatuses that run them. It is contemplated, for example, that implementations of the disclosure as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code encoded therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code encoded by a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

Unless explicitly stated or otherwise clear from the context, the verbs "execute" and "process" are used interchangeably to indicate execute, process, interpret, compile, assemble, link, load, any and all combinations of the foregoing, or the like. Therefore, implementations that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, implementations of the disclosure are not described with reference to any particular programming language. It is appreciated that a variety of programming languages may be used to implement the present teachings as described herein, and any references to specific languages are provided for disclosure of enablement and best mode of implementations of the disclosure. Implementations of the disclosure are well suited to a wide variety of computer network systems over numerous topologies. Within this field, the configuration and management of large networks include storage devices and computers that are communicatively coupled to dissimilar computers and storage devices over a network, such as the Internet.

The respective reference numbers and descriptions of the elements depicted by the Drawings are summarized as follows.

105 machine
110 propulsion method
110B propulsion method
110A propulsion method
110B propulsion method
115 control surface
115A control surface
115B control surface
120 machine longitudinal axis
125 control surface/foil
125A control surface/foil
125B control surface/foil
130 control surface/foil
130A control surface/foil
130B control surface/foil
135 control system
140 flow
140A flow high side
140B flow low side
145 wake
150 yaw angle
155 roll angle
160 machine vertical axis
165 machine forward motion
170 wave
170A wave
170B wave
170C wave
170D wave
175 enhanced wave surface
180 wakeboard
185 wakesurfer
205 motor
210 propeller
215 hydraulic cylinder
220 thrust
225 hydraulic pump
230 battery management system
235 helm station
240 interface/display
245 propulsion method thrust vector range
250 propulsion method thrust vector range limit
255 propulsion method thrust vector range limit
260 propulsion method thrust vector range
265 propulsion method thrust vector range limit
270 propulsion method thrust vector range limit
505 control surface/tab
505A control surface/tab
505B control surface/tab
510 control surface/tab extended
515 control surface/tab retracted
1405 processor
1410 memory
1415 program memory
1420 data memory
1425 Wake Surf Enhancement Engine (WSEE)
1430 storage medium
1435 i/o interface
1440 user interface
1445 multimedia interface
1500 Control Process #1 Flow
1600 Control Process #2 Flow
1700 Wake Surf Enhancement Cloud Architecture
1705 mobile device
1710 wireless communication link
1715 network cloud
1720 wireless access point
1725 wireless access point
1730 wireless communication link
1735 router
1740 mobile device
1745 communication link
1750 database server
1755 communication link
1805 wave lower range
1810 wave upper range
1815 wave vortex A number of implementations have been described. Nevertheless, it will be understood that various modifications may be made. For example, the steps of the disclosed techniques may be performed in a different sequence, components of the disclosed systems may be combined in a different manner, or the components may be supplemented with other components. Accordingly, other implementations are contemplated, within the scope of the following claims.

What is claimed is:

1. An apparatus comprising:
a watercraft, wherein the watercraft has a longitudinal axis;
a propulsion system configured in the watercraft, wherein the propulsion system comprises at least two propulsion sources disposed off-center from the watercraft's longitudinal axis, and wherein the propulsion system has a differential thrust vector that is adjustable with respect to the watercraft longitudinal axis;

a plurality of control surfaces configured in the watercraft and disposed off-center from the watercraft's longitudinal axis, wherein at least one control surface of the plurality of control surfaces is rotatably adjustable in the plane of the watercraft longitudinal axis; and a control system, comprising:
- a processor operably coupled with the propulsion system and the plurality of control surfaces; and
- a memory configured to be operably coupled with the processor, wherein the memory comprises encoded processor executable program instructions and data, wherein the processor executable program instructions and data jointly program and configure the apparatus that when executed by the processor the processor executable program instructions cause the apparatus to perform operations comprising:
  - move the watercraft in water by the propulsion system to generate a water flow separated by the watercraft into a higher rate flow and a lower rate flow governed by a yaw slip angle of the watercraft;
  - adjust a rate difference between the higher rate flow and the lower rate flow based on adjusting the yaw slip angle of the watercraft determined as a function of a position of the at least one control surface and the propulsion system's differential thrust vector; and
  - direct the higher rate flow to converge with the lower rate flow to create and maintain a wave, based on actively adjusting the at least one control surface position and the propulsion system's differential thrust vector.

2. The apparatus of claim 1, wherein each propulsion source of the least two propulsion sources is independently adjustable.

3. The apparatus of claim 2, wherein each propulsion source thrust magnitude is adjustable.

4. The apparatus of claim 2, wherein each propulsion source thrust direction is adjustable.

5. The apparatus of claim 2, wherein at least one of the at least two propulsion sources further comprises a motor.

6. The apparatus of claim 5, wherein the motor is electric.

7. The apparatus of claim 2, wherein at least one of the at least two propulsion sources further comprises a thruster pod.

8. The apparatus of claim 2, wherein at least one of the at least two propulsion sources further comprises a water jet.

9. The apparatus of claim 1, wherein the plurality of control surfaces further comprises at least two control surfaces.

10. The apparatus of claim 1, wherein the apparatus further comprises the at least one control surface of the plurality of control surfaces is rotatably adjustable 360 degrees.

11. The apparatus of claim 1, wherein the at least one control surface of the plurality of control surfaces further comprises at least one fin.

12. The apparatus of claim 11, wherein the apparatus further comprises the watercraft having a hull, wherein the at least one fin is disposed in the watercraft hull, and wherein the at least one fin is configured to pivot side to side in the plane of a horizon viewable from the watercraft.

13. The apparatus of claim 1, wherein the at least one control surface of the plurality of control surfaces further comprises at least one foil.

14. The apparatus of claim 13, wherein the watercraft has a vertical axis, wherein the apparatus further comprises the at least one foil disposed in a side of the watercraft, and wherein the at least one foil disposed in the side of the watercraft is configured to rotate in the plane of the watercraft's vertical axis.

15. The apparatus of claim 1, wherein the apparatus further comprises the at least one control surface of the plurality of control surfaces is disposed forward of at least one propulsion method.

16. The apparatus of claim 1, wherein the apparatus further comprises the at least one control surface of the plurality of control surfaces is disposed aft of at least one propulsion method.

17. The apparatus of claim 1, wherein the apparatus further comprises an electric servo motor operably coupled with the processor, wherein the electric servo motor is configured to adjust a position of the at least one control surface of the plurality of control surfaces.

18. The apparatus of claim 1, wherein the apparatus further comprises a hydraulic cylinder operably coupled with the processor, wherein the hydraulic cylinder is configured to adjust a position of the at least one control surface of the plurality of control surfaces.

19. The apparatus of claim 1, wherein the control system further comprises a camera operably coupled with the processor.

20. The apparatus of claim 19, wherein the wave has a rider, and wherein the memory further comprises processor executable program instructions configured to cause the apparatus to perform operations further comprising provide feedback determined as a function of the rider's stance and position riding the wave, based on identifying by an image recognition algorithm an image of the rider captured by the camera.

21. The apparatus of claim 1, wherein the memory further comprises processor executable program instructions configured to cause the apparatus to perform operations further comprising changing the wave in a user defined pattern for a predetermined time period, based on actively adjusting the at least one control surface position and the propulsion systems' differential thrust vector according to the user defined pattern for the predetermined time period.

22. The apparatus of claim 1, wherein the memory further comprises processor executable program instructions configured to cause the apparatus to perform operations further comprising adjust a thrust magnitude of at least one propulsion source.

23. The apparatus of claim 1, wherein the memory further comprises processor executable program instructions configured to cause the apparatus to perform operations further comprising adjust a thrust direction of at least one propulsion source.

24. The apparatus of claim 1, wherein the memory further comprises processor executable program instructions configured to cause the apparatus to perform operations further comprising adjust at least one control surface position.

25. The apparatus of claim 1, wherein the control system further comprises at least one sensor operably coupled with the processor.

26. The apparatus of claim 25, wherein the memory further comprises processor executable program instructions configured to cause the apparatus to perform operations further comprising determine the yaw slip angle based on sensor information.

27. The apparatus of claim 25, wherein the memory further comprises processor executable program instructions configured to cause the apparatus to perform operations further comprising determine the at least one control surface position based on sensor information.

28. The apparatus of claim 25, wherein the at least one sensor further comprises an accelerometer.

29. The apparatus of claim 25, wherein the at least one sensor further comprises a gyroscopic sensor.

30. The apparatus of claim 25, wherein the at least one sensor further comprises a location sensor.

* * * * *